(12) United States Patent
Conant

(10) Patent No.: US 10,290,023 B2
(45) Date of Patent: *May 14, 2019

(54) METHODS AND APPARATUS FOR SENDING CONTENT TO A MEDIA PLAYER

(71) Applicant: Mediafly, Inc., Chicago, IL (US)

(72) Inventor: Carson Victor Conant, Glenview, IL (US)

(73) Assignee: MEDIAFLY, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,688

(22) Filed: Feb. 22, 2016

(65) Prior Publication Data

US 2016/0171559 A1    Jun. 16, 2016

Related U.S. Application Data

(63) Continuation of application No. 14/284,540, filed on May 22, 2014, now Pat. No. 9,269,099, which is a
(Continued)

(51) Int. Cl.
| | |
|---|---|
| G06Q 30/02 | (2012.01) |
| H04L 29/08 | (2006.01) |
| H04N 21/41 | (2011.01) |
| H04N 21/81 | (2011.01) |
| H04N 7/173 | (2011.01) |
| H04N 21/235 | (2011.01) |

(Continued)

(52) U.S. Cl.
CPC ..... *G06Q 30/0269* (2013.01); *G06Q 30/0272* (2013.01); *H04L 67/306* (2013.01); *H04N 7/17318* (2013.01); *H04N 21/235* (2013.01); *H04N 21/252* (2013.01); *H04N 21/2543* (2013.01); *H04N 21/25891* (2013.01); *H04N 21/4126* (2013.01); *H04N 21/435* (2013.01); *H04N 21/4722* (2013.01); *H04N 21/4828* (2013.01); *H04N 21/812* (2013.01); *H04N 21/8405* (2013.01); *H04N 21/44213* (2013.01)

(58) Field of Classification Search
None
See application file for complete search history.

(56) References Cited

U.S. PATENT DOCUMENTS

| | | |
|---|---|---|
| 6,357,042 B2 | 3/2002 | Srinivasan et al. |
| 7,047,302 B1 | 5/2006 | Chatani |

(Continued)

*Primary Examiner* — James R Sheleheda
(74) *Attorney, Agent, or Firm* — Katten Muchin Rosenman LLP

(57) ABSTRACT

The present disclosure provides methods and apparatus for sending content to a media player. In general, a user of the disclosed system consumes a plurality of media content (e.g., audio content, visual content, audiovisual content, etc.) distributed from a media server. The content preferably include advertising content and non-advertising content. Some or all of the content is selected by the system based on the user's specific requests, profile, preferences, and/or feedback, in conjunction with the profiles, preferences, requests, and feedback of other users, (e.g. using social media, social matching and/or collaborative filtering techniques). Preferably, the feedback includes statistical data indicative of partial experiences (e.g., user listened to 50%) of the content by one or more media consumers.

22 Claims, 7 Drawing Sheets

Related U.S. Application Data continuation of application No. 11/836,766, filed on Aug. 9, 2007, now Pat. No. 8,752,086.

(60) Provisional application No. 60/821,898, filed on Aug. 9, 2006.

(51) Int. Cl.
*H04N 21/258* (2011.01)
*H04N 21/435* (2011.01)
*H04N 21/442* (2011.01)
*H04N 21/482* (2011.01)
*H04N 21/2543* (2011.01)
*H04N 21/4722* (2011.01)
*H04N 21/8405* (2011.01)
*H04N 21/25* (2011.01)

(56) References Cited

U.S. PATENT DOCUMENTS

| | | |
|---|---|---|
| 7,212,979 B1 | 5/2007 | Matz |
| 8,046,797 B2 | 10/2011 | Bentolila |
| 8,321,278 B2 | 11/2012 | Haveliwala et al. |
| 8,752,086 B2 * | 6/2014 | Conant ............... H04N 7/17318 725/14 |
| 9,269,099 B2 * | 2/2016 | Conant ............... H04N 7/17318 |
| 2001/0023436 A1 | 9/2001 | Srinivasan et al. |
| 2002/0124250 A1 | 9/2002 | Proehl et al. |
| 2003/0093311 A1 | 5/2003 | Knowlson |
| 2003/0101449 A1 | 5/2003 | Bentolila et al. |
| 2005/0235318 A1 * | 10/2005 | Grauch ................ G06Q 30/02 725/46 |
| 2006/0288367 A1 * | 12/2006 | Swix ................ H04N 7/17318 725/46 |
| 2007/0204310 A1 * | 8/2007 | Hua ................ H04N 7/17318 725/88 |
| 2008/0092182 A1 | 4/2008 | Conant |
| 2012/0278167 A1 | 11/2012 | Schwartz |
| 2012/0281963 A1 | 11/2012 | Krapf et al. |
| 2013/0339146 A1 | 12/2013 | Goldberg et al. |
| 2014/0031960 A1 * | 1/2014 | Hill ......................... G06F 3/165 700/94 |
| 2014/0201783 A1 | 7/2014 | Matz |
| 2014/0257994 A1 | 9/2014 | Conant |
| 2015/0074715 A1 * | 3/2015 | Berger ............... H04N 21/4147 725/34 |

* cited by examiner

METHODS AND APPARATUS FOR SENDING CONTENT TO A MEDIA PLAYER

CROSS-REFERENCE TO RELATED APPLICATIONS

This application is a continuation of U.S. application Ser. No. 14/284,540, filed May 22, 2014 which is a continuation of U.S. application Ser. No. 11/836,766 (now U.S. Pat. No. 8,752,086), filed Aug. 9, 2007, which claims the benefit of U.S. Provisional Patent Application Ser. No. 60/821,898, filed Aug. 9, 2006, which is incorporated herein by reference in its entirety.

FIELD OF DISCLOSURE

The present system relates in general to media distribution and more specifically to methods and apparatus for sending content to a media player.

BACKGROUND OF THE DISCLOSURE

During the past decade or more, there has been an explosion of multimedia sources available via the Internet, satellite, wireless, cellular and other means of communication. All of these means of communication provide various content that is so voluminous that selection of any meaningful segments for an end user to listen to and/or view during their busy day is becoming a nearly impossible task.

Prior art on content delivery and social matching of content to the end user's preferences has been less than successful especially for the busy commuter who would like to download popular segments to a mobile device for listening or viewing during their commute to and from work. These are some systems using various methods of delivering media content, but these systems either lack the selection mechanism of the present system.

SUMMARY OF THE DISCLOSURE

The present system selects and delivers personalized multimedia content to a user's multimedia device (e.g., computer or mobile device). Multimedia content includes any audio and/or visual content. The content can be selected from the system's servers and/or from external sources. The content is selected by the system based on the user's specific requests, profile, preferences, and/or feedback, in conjunction with the profiles, preferences, requests, and feedback of other users, (e.g. using social media, social matching and/or collaborative filtering techniques). Preferably, the feedback includes statistical data indicative of partial experiences (e.g., user listened to 50%) of the content by one or more media consumers.

The system allows an end user to have a single network source for personalized podcasts, news, sports, comedy, pop-culture, music, technology, financial information, entertainment, music, television, movies and more that is delivered to the end user through a computer or mobile device. This limits the need to search through thousands of multimedia feeds and published sources to find the information that the end user desires as the system does that work for the user.

As a result, the user spends more time enjoying the content while the system selects the end user's media content based on the user's feedback on content segments listened to and/or watched. Moreover, whether a content provider is an independent author or well-known publisher, the present system helps both to monetize the provider's content and to deliver system content to individual end users that are interested in the provider's content.

DETAILED DESCRIPTION OF THE DISCLOSURE

Figure 1:
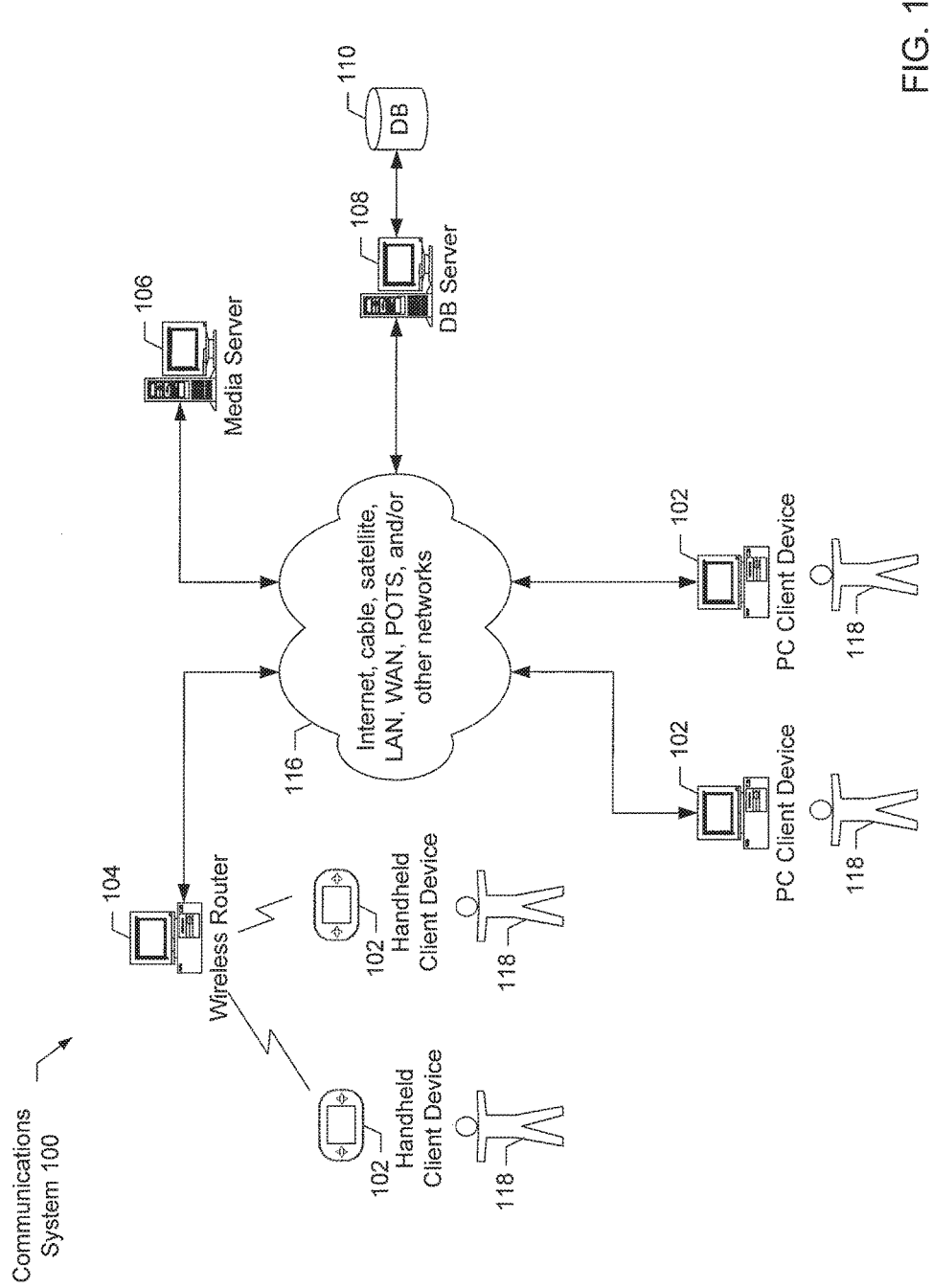
FIG. 1 is a high level block diagram of an example communications system.

A system and method for creating a content management and social matching network that selects the appropriate content in audio and/or visual format based on a user's profile, demographics, preferences, requests, and/or other feedback events is disclosed. The System delivers that the selected content via the internet, satellite, digital radio transmission, cell phone, or any other wired or wireless digital communication method to a PC application, web interface, and/or a portable device, via streaming media or download. In some embodiments, the content is downloaded to a PC for subsequent loading onto a portable device for later playback.

In one embodiment, the system addresses the problem of weeding through the thousands of multimedia sources with their extensive content to find desired content for a particular end user by utilizing various feedback events and collaborative filtering to select appropriate content for a given end user and then delivering the selected content via streaming or downloading over the internet to the end user's PC or mobile device for playback at the end user's convenience.

The system may also include the ability to acquire content from many different content providers. A content provider (e.g. publisher, author, individual, etc.) inputs their content to a provider network (hereinafter "network") of the present invention. The content is "tagged" with relevant data, such as keywords that describe the source, author, topics of content segment, and any other relevant details about this segment. These keywords are specified by the author, publisher, a network administrator, or from a speech-to-text converter that indexes the audio file for keywords, or any combination thereof. In addition, end users are able to input keywords that they think are relevant for that content segment. The data associated with the segment may also include details about the media file (e.g., format, length, duration, bit rate, etc.), as well as how the content interrelates to other content and users.

Various methods are provided to allow users to easily enter keywords, such as an interactive web page or application that is accessible from a PC or wireless mobile devices. Optionally, the keywords are extrapolated to include synonyms or related keywords. For example, the keyword Bill Gates may be extrapolated to include "Microsoft."

Content may also be aggregated from external sources by a web crawler, search tool, or a content feed standard, such as Real Simple Syndication (hereinafter "RSS") or similar method/protocol. Where legal according to copyright law, the system facilitates the download of podcasts or other audio segments available on the Internet (and allowed by the owners) without a content provider's direct intervention on behalf of each segment. Keywords may be discerned from the RSS feed (or similar system) as well as by the methods described above. The system allows for both short and long audio segments.

Content may be uploaded to the network in a variety of ways such as but not limited to those below:

1. Audio file upload via web interface or application.
2. Audio file emailed to network in a pre-defined format.
3. Entered into the system manually by a network administrator.
4. Via PC or device microphone or other direct voice input.
5. Via telephone, or other direct voice input.
6. Via a wireless communication via satellite.
7. Via cellular towers for cellular phones having streaming audio and video.

Content providers may set various optional features related to individual content segments or to all content they upload, such as:

1. Content is indicated such that it must follow another segment. For example chapters in a book often only make sense in linear format. Therefore each segment is marked as 1/X such that a segment may only be played if the previous segment in the list had already been played. This option may be at the discretion of the author/content provider.
2. Content is made available only to certain users or groups of users
3. Content is made available to users with specified demographics or psychographics, location, preferences, etc. For example, a content provider indicates that a segment should only be played to people of a specific age group, living in a certain part of the country, who are interested in a certain subject, etc.
4. Content is made available at certain times of the day or for a specified date range.
5. Content is made available for a certain number of impressions. For example, if a user views or listens to some or all of a segment that would be one "impression."
6. Content is indicated with a language so that it was matched only to users who have chosen to accept content in that language.
7. Content Providers are able to choose the economic model for this content, such as: a. Deliver to all users; b Deliver only to paid subscribers; c. Deliver on a pay-per-use basis.
8. Content providers may be required to specify any profane language included in the content or indicate a rating of the content based on a pre-determined rating system for profanity. Such content may only be delivered to users who have selected to allow for such content.
9. Content Providers may be allowed to upload multiple versions of the same piece of content, for example, with a different lead-in or different commentary that appeals to different demographics. In many cases, only one of the versions is delivered to a particular user. Additional example options available to the content providers include: a. The Provider monitors the performance of each segment and can deactivate or modify any of the versions; b. The Provider specifies which versions are delivered to different demographics. For example, one version has a younger person reading the content for a younger demographic; c. The Provider selects an "auto-optimize" setting which determines through statistical analysis which segment is played based on their relative performance or which segment is played to which type of user for best response; This service is free or available for a charge.

An interface or application may be provided to allow users to modify their content such as basic-to-advanced multimedia editing as follows:

1. The system may allow a user to trim content, normalize audio spikes, cut out segments, splice in audio effects from a library, etc.
2. Audio content may be broken up into small logical discrete segments that make sense on their own. However, much of the content that is currently created by publishers and podcasters alike is longer format content that covers multiple topics. Therefore, this system helps a content provider easily "cut" a large file into smaller files or simply denote the breaks in the longer content. For example, if a user has created a one-hour podcast, they indicate the break points within that hour of the various independent subjects. The system then either marks those places or separates the larger file into smaller independent files, which may then be delivered independently.

Content Providers may specify support content, such as generic introductions or tail-plugs for their content. The system may then play those segments at the beginning and/or end of the one or more segments. The system may choose when to play these support files to create the best listening experience possible, such as play an introduction piece only the first time content by a particular provider is played within a particular amount of time.

An interface or application may be provided for Content Providers to manage and monitor their content, such as but not limited to the following:

1. View each segment and see how many people have experienced that content.
2. View the overall feedback of their content.
3. View the feedback of different user groups, demographics, psychographics, geographic location, etc. For example, a Content Provider may view feedback on content segments from a specific age group or demographic.
4. View the feedback/impressions over time.
5. View the feedback relative to similar content from other Content Providers.
6. Deactivate segments or modify any available options.

An interface or application may be provided for Content Providers to manage their income from advertisements and/or subscription revenue, such as have their income transferred to a bank account or other financial institution, online payment system (e.g. PayPal), paid by check, etc. Some or all Content Providers may be required to pay a fee to be able to upload content. This may be on a subscription basis (e.g., monthly or yearly) or it may be a per-upload, per-download, or similar, fee.

Because users are allowed to input content, the network benefits from some monitoring and regulation to enhance quality. Certain standards may be met to approve content before going into the network or remove/limit content already in the network. Systems may be put in place to allow this monitoring and regulation by any combination of network administrators, outside partners, selected peer-review users or groups, or general users. These individuals and/or groups may then be responsible for monitoring the inputted content.

Revenue may be generated through a combination of advertising, subscription fee, and ala carte purchases. There may be varying subscriptions for different levels of "premium" content or for access to certain content providers. There may also be an ala carte method whereby users pay to access certain content, and revenue may be shared with the content providers.

Content Selection

Content may be selected for a given user based on information about him or her (hereafter "him"), including such things as a profile, demographics, geographic location, preferences, specific requests, the collection of feedback on other segments ("feedback events") or any other suitable method to discern the specific interests of a user. A profile (e.g., user profile, ad profile, content profile, etc.) may include any suitable data associated with the associated object (e.g., user, ad, content etc.) Profile data may be entered manually (e.g., the user selects keywords) and/or automatically (e.g., the user listens to most of an audio file about cars). A user's profile may also be used in conjunction with the profiles of similar users to select content that a user is most likely to enjoy (e.g. social matching).

A method is provided for users to create an initial profile by indicating key demographic and preference details. This profile may be created through an input from a web interface, a PC or mobile application, or via a telephone call. This profile setup is not required, but it helps the system initially determine what content to send to a given user. A method is also provided for users to give feedback on the segments they experience.

One piece of content reviewed and rated higher by one type of person and yet is rated lower by another type of person may still be fed to people whose profile were similar to the user who liked it. For example, a segment on "Star Trek" is disliked by the masses (and therefore not selected for those users) but adored by people who like the keyword "Star Trek" and other similar content. Therefore the "Star Trek" segment is selected for those users. In other words, content has an overall popularity value but it is also matched to users based on the popularity of that segment as reviewed by people of a similar profile.

Personal Content Popularity

The user may specify as broad or as narrow of a content theme/topic to experience similar to how a user tunes to a specific radio station for specific type of information (e.g. news or sports). However, in this system, the "channels" may be very broad or very narrow depending on the user's interests. For example, a user may broadly specify "business" or "Brad Pit, Angelina Jolie, pop culture, and baby." Those keywords may then be fed to the system through a user-input method, which includes but is not limited to hardware buttons, software buttons, multiple choice menus, categories, text entry or voice input. The user may also choose to enter no topic criterion in which case the system may select the content segment in the network from all available topics based on that person's profile. Subsequent segments are the next segment on a topic. Yet another scenario is that the next segment selected would the next best segment for that user that is on a similar topic or shares similar keywords to the previous segment, thereby giving a contiguous experience.

A combination of the following may be used to rank the segments in the network for a particular user. Weighting may be determined based on statistical modeling and testing (e.g., regression analysis) and refined based on customer feedback and improvements of the algorithms as follows:

1. Any specific parameters (e.g. keywords, topics, etc.) this user has requested such as a particular topic to "lock in." The user could choose very specifically (e.g. "Bill Gates, Microsoft, monopoly lawsuit") or broadly (e.g. "news"). The user has the option to select no parameters. The user may be given popular content as determined by other people with a similar profile. A similar profile may be determined as profiles of people who have liked content or topics that the user has liked (and also possibly disliked content or topics that he has disliked). Like and dislike may be based on how much of a particular piece of media the user chooses to experience. For example, a user who listens to 15 seconds of a one minute advertisement (25%) may be categorized as liking that advertisement less than a user who listens to the same advertisement for 45 seconds (75%). These amounts may be recorded during playback and/or determined by click data (e.g., user presses skip or stop during playback).

2. Another metric to measure a segment is content velocity. The speed at which a segment is growing or decreasing in popularity (e.g., feedback over time as opposed to total feedback for that segment) may be used to give weight to the segment. Therefore, content that is increasing rapidly in popularity may be selected more preferentially over content that may rank higher but is not increasing in popularity as much.

3. Content "Karma" is another factor. New content (not very widely reviewed yet) gets the "karma" or starting ranking that is related to previous content by that content provider in the network system. Therefore, previous popularity of segments helps or hurts the starting point of new content by that same source in the network system. In addition, Karma is often related to the topic or profile. For example, a user who has posted content on "gardening" that is reviewed well by a certain type of person, may get a good starting ranking for "gardening" with that type of person. However, that user may get a low starting review for people outside that profile type, who are not interested in that subject.

4. Distribution limitations are also feasible with the present system. Content providers may specify limitations for content as to who can receive it, such as geographic location, demographic details, language, profile types, or any other determining factor. In addition, content providers may temporally limit the content by specifying expiration date, specific dates or times of the day to be played, etc. Segments may not be selected for a particular user if that user does not meet the requirements of these settings.

5. Filter preferences are also another feature of the present system. If a user has filter preferences set up, then any segments, which conflict with those filter preferences, are preferably not selected. For example, filter preferences may be used to filter out content with swear words, certain content ratings, content with specific keywords, and/or content by certain authors.

6. Content relationship to other content may also be a factor in content selection. If a segment is the first segment in a related series e.g., (by the same author), then the other segments in the series may be selected in their relative order. For example, a file that is 1 of X may be given preference over a file that is 2 of X It is an option for a user to mandate that a previous segment is played before the next segment is played so that content is delivered in a useful (or predetermined) order. However this does not necessarily mean that because file 1 is played first that file 2 is played if file 2 does not meet the selection criterion for this user. Content relationship does not have to be for just content by the same author or in the same series. For example, a content provider discussing a Presidential speech might specify that his segment is to follow either another specific segment or any segment with certain keywords. This allows for content that makes sense only in connection to another piece when played in a proper sequence so, for example, one piece is not played unless another piece is played first.

7. Groups (and buddy lists) are effective methods for improving social matching, whereby the collective inputs of trusted groups affects the experience of individuals. The users are given the opportunity to create, join, subscribe to, or otherwise participate in various groups. Content reviews by members of the groups may affect the selection of content for a user of that group. For example, a user may create a group with friends. If one friend reviews certain content well, it may be given preference to be selected for the other members in the group. Preference may mean that the content receives a higher priority. This may be a function of the selection logic or a user-specified selection as to how to handle group content. These groups are often collaborative, in which case some or all of the members of the group may affect the selection. Or, the segments reviewed in a group may be made by a select few, but delivered to many. For example, someone subscribes to Bill Gates' group and is fed segments that he reviewed well. However, the recipients' feedback events do not affect the content experienced by Bill Gates. In another example, the members of a rock band contributes to the same group whereby there are multiple contributors affecting the preferred content by that group. However, people who subscribe to that group, such as fans, but are not collaborators receive the content preferred group's collaborators but the fan's feedback events do not affect the preference of content delivered to members of the rock band or other subscribers to the group. In other words, in this type of group, only feedback from the controlling members (e.g. the band members in the case above) can affect the preference of segments delivered to subscribers to the group.

8. Users may also select to send content directly to other users or distribution groups with an action. For example, person A listens to a piece of content and then selects a "forward to" option and then specifies an individual, series of individuals, or a group. That file is then given preference for those users. In the case of buddies and groups, the users may determine how they want to receive group or buddies-preferred content. For example (but not limited to) users may specify any combination of these following options: a. Prompt me before playing group content; b. Insert group content without prompting me; c. Only play group content that is relevant to what I am listening to now; d. Play group content regardless of what I am listening to now; e. Users block or filter group content 9. The user may also choose content based on a mood. For example, in the morning the user could decide to select "light" and would be fed things like stand up comedy, sports, light news, etc. In the evening, the user could decide to selects "serious" and is fed things like news segments on the war in Iraq or a recent murder. This mood selector may be used in conjunction with or independently from topics or specific keywords. For example, a user selects "light" for the mood and "news" for the content. The "mood" selector is user-controlled as described above, and/or it is an automatic feature, whereby the system determines the user's mood automatically from current or past listening habits and distribute content K corresponding to that determined mood.

10. Another factor in a user's profile may be preferred acceptable languages. When this factor is used, only content in those languages is preferably selected and delivered to that user. Users can specify a single language or multiple languages.

So that users do not get fed continually narrowing types of content, the system is designed to introduce "disruptive" segments periodically to challenge the system's assumptions about a user or offer an opportunity for users to experience information outside their normal interests that they never selected on their own. The disruption may be from randomly selected content and/or from content outside the user's profile that the system determines the user likes. How this type of disruption is used is tested and is not used for certain users, profile types, or at all if it is not found to be beneficial.

So that users do not receive multiple segments with fundamentally redundant content from different sources, the system has logic to limit segments that are too similar to other content already selected for a user. For example, the system may prevent two news segments that talk about the same event and are too similar to both be delivered to the same user. However, the system preferably allows two segments that have enough differences to be fed to the user, such that the segments compliment each other rather than overlap extensively. This system employs any combination of keyword matching, user or administrator monitoring, user feedback, etc. to determine what defines content that is duplicate (and redundant) and what is similar yet complimentary.

Distribution

Content may be distributed to users via a web interface on a computer (also referred to as a "PC") (with support for many different operating systems) or mobile device (also referred to as "portable device") or a software application running on a PC and/or portable device. Mobile devices are any combination of hardware or software that are used to receive and provide for the experience of multimedia content, which include but is not limited to digital media players (e.g. mp3 players, iPods, etc.), cellular phones, telephones, Personal Digital Assistants (PDAs), mobile PCs, satellite receivers, digital radio receivers, or home cable receivers. Examples of portable devices are a Palm Pilot, Pocket PC, blackberry, MP3 player, proprietary device, cell phone, smart phone, or any other mobile device, which facilitate the playing of multimedia content.

Content may also be distributed to third party interfaces. These third party providers may be approved licensees, or the protocols and methods may be made public for anyone to design an interface without approval from the network owner.

If a relatively constant connection to the Internet is available to facilitate streaming audio, the selected audio segments (as determined by the system) may be streamed to the user based on the matching described above. Or, if it is more efficient based on the users' computer platform, bandwidth available, and other variable factors, content may be downloaded to the PC or device in the background for play later. When a connection is available, the device may upload feedback preferences (described below). The system may then select content based on the matching system and return which new segments to download and which segments that currently exist on the device are in need of deletion. The device then downloads the new segments as long as a connection is available. If the connection is lost, the process starts over again upon the next connection, or it continues the previous download set before requesting a new set. Preferably, this all happens in the background while the user is optionally listening to content already on the device or using the device for some other purpose.

The selection system may specify a download location for the file that is located on the network servers, or an external server. In other words, the content does not all have to reside on network servers. Some content may reside on independent servers. The application or interface then facilitates the downloading of those files from each particular file's download location.

In the case of a download device, where it operates without direct connection to the network, the device may include logic whereby it further refines what segments are more appropriate for that user at that time based on the available content on the device based on recent user feedback events. In some cases, a device may need to be connected to a PC in a "hot sync" to upload the feedback events and download the segments. An example is a device that does not have Wi-Fi or wireless data ability.

In a download scenario, segments may be downloaded in specific topics that the user has currently requested. In addition, segments may be downloaded in other areas that the user has shown interest in (or the system determines might be of interest) so that if he decides to listen to a new content topic, it is available. For example, if a user selects "news" but also shows a preference for (or the system determines he would be interested in) "business," "sports," etc., the system may download a certain amount of "news" but also downloads other segments of interest so that if he does decide to listen to something new, it is already on his device. For example, a user may be on an airplane, cut off from any download ability, and then decides to stop listening to news and start listening to sports. The user's sports data is already loaded on the device based on his profile. In addition, there is other content that the user has not shown a preference for, but the system determines he likes based on similar users. Still other parameters may be determined to add to the selection method based on customer feedback.

In the case of some portable device or PC, an application or interface may select the segments that are played (or the playlist). Depending on the hardware and software on that device or PC, the application could play the content directly or use the device's native or default playing method(s) or application(s) to play that file or play list.

In some cases, a device may lack the ability to run a proprietary application on the device to select and/or play segments. In this case, the files may be loaded onto the device as a single playlist, or a series of play lists may be created to deliver those segments in a useful order. For example, playlists may be uploaded on various subjects, such as news, sports, politics, pop culture, technology, Wall Street, etc. Each of these topics has may have its own playlist, which indicates the respective content in a predetermined order.

In some cases, content could be in multiple playlists because it belongs to different genres or categories of content. For example, a news segment on Google may be found in both a news play list and a technology play list. It is for this reason and others that it is desirable to have a specifically designed interface to select and manage the playing of segments, but in order to use the largest installed base of technology the segments must be able to be used as best as possible on devices or in situations in which a specific application or interface does not exist.

Advertisements are preferably inserted into, or delivered in conjunction with, the non-advertising content as a means to generate revenue. Advertisements are delivered to all users or optionally only users of certain subscription types. These ads are placed at predetermined locations, played at certain time intervals, played between segments or any combination thereof depending on the given situation, user, device, and/or piece of content. Also, for a premium, the end user may choose to receive content segments without any advertisements.

The system provides several ways to deliver advertisements. One such method is to insert the ads into the multimedia segment files before being downloaded as to be part of the file. Another method is to deliver the ads as separate multimedia files as part of a user's playlist. Yet another method is to downloaded the ads as separate files and provide a method (e.g. software or hardware) that would select from the available ads and play them at appropriate times. The System may also enable a mechanism whereby a user is unable to fast-forward through, or skip over, an advertisement and is required to hear or see the entire content of the ads in order to progress to a subsequent content segment.

The system preferably determines which ads to deliver to users. Ads may be selected for a particular user based on that user's profile, preferences, demographics, psychographics, age, location, general listening habits, interests, etc. (Referred to as "Profile Ads"). Additionally, advertisements may be delivered to a user based on the keywords, topics, author, source, etc. of the multimedia segments being delivered (Referred to as "Content Ads"). Additionally, ads may be delivered based on how much an advertiser is willing to pay relative to competing ads. Ads may be matched based on any combination of profile, content, or ad spending. Ads may also be delivered with no matching whatsoever (e.g. a brand advertiser who does not care who receives the ads). Advertisers may optionally specify criterion for matching, or the system may determine which users to match particular ads to.

Companies may want a method to leverage the system to deliver content to their customers. To facilitate this desire, the system provides to publishers, content providers, licensees, partners, and the general public, applications, interfaces, or other methods (referred to as a "front end") to deliver desired content to their customers. These front end methods are designed to deliver all content or at the company's choosing to only allow certain types of content to be delivered. For example, a publisher may provide an interface or application for their customers that only allows their content to be played. The publisher may also decide to allow their content and other select content to be played through their interface. This allows the companies (e.g. the publisher above) to leverage the network's back-end technology infrastructure for whatever content they select. This feature is not restricted to content providers. For example, a user may have the ability to create an interface that only allows a certain type of select content to be delivered (e.g. a customized channel). Or, the system may allow the user more control of the content through his interface, acting like a disk jockey manually specifying which segments are played in what order, essentially creating their own online radio station, which draws from the collective content available in the archives of the network. Revenue earned from users of a particular front end may be shared with the creator of that front end.

Users may also be given the ability to request specific content in a linear format, such as a traditional audio book. Linear content may be delivered as a set of segments strung together continuously. Linear content segments may still have the properties of any other network segment as follows:

1. If a user hears a particular subject that is interesting he could choose to break from the linear content and go deeper into that subject, such as by using a "more" feature. The user could also choose to return at any time to the linear content and pick up where he left off; and 2. Users may have the same feedback methods (as described previously) for linear segments as they would for any other segment.

The system may also be used to facilitate training for schools, institutions, companies, etc. Rather than a company training director instructing employees to read a particular book, he instead may instruct subordinates to listen to or watch at least a certain amount of time on a particular subject. The users then get to experience information about that subject most relevant to them. Therefore, each employee has a different listening experience based on what he/she was most interested in. The "course" on that subject is therefore a dynamic contiguous feed of content on a particular subject.

A training director could also choose to specify certain mandatory segments to be included. The director could assign proprietary segments from the company, unavailable to the general public, or any segments in the network that the training director believes are relevant. The director could also choose to select or create a "starting point" segment. That is the first segment, after which content is fed on similar topics to that segment's keywords (e.g. sales) based on the social matching method.

The content use may be monitored, and the system may measure the amount of time each user spends on each assigned subject. A superior may view all his users and how long they have listened in select areas. The superior may also view the most popular segments common to the group, allowing him/her to understand what the employees are most interested in. For example if the subject is "sales," the superior is able to determine that the most popular segments were about "Internet sales strategies."

The present system also allows users many methods to expand the media experience beyond what they experienced in the network. For example, the segments a user has listened to may be sent to that user in an email newsletter allowing users to review the segments and perhaps read more information related to that content (e.g., with links to appropriate websites). Also, this allows users to review content and provide additional feedback, reviews, etc.

A user will may be given an interface to view segments that he has listened to or that are downloaded to the device. This may be done on a web page, application, or an interface on enabled (or capable) devices. At any time, a user may select segments to be listened to or viewed again. The user may also be given an interface to view his review of previous segments and provide additional feedback about those segments.

Feedback Methods

A user may be given several mechanisms to offer feedback on content segments and their experience. Some devices or applications vary in degrees of these functions depending on the device or platform limitations.

The user may be able to rate the content, such as, but not limited to a 1-5 scale. Users may be given a hardware or software method to enter the specific rating value. Or, rating may be done with thumbs up/thumbs down type input where the input is translated to a numerical value, such as but not limited to: two thumbs up=5, no input=3 and two thumbs down=1).

If the user selects "next" to skip over a segment that is preferably a feedback event. For example, if the user selected "next" after listening to a small amount of a file, it is assumed that the user did not like that segment. If the user listened to a certain amount or certain percent, the system may determine that they were just ready for the next content and it is not a negative reflection on the content.

Another feedback method is the amount of a segment listened to or watched. For example, if the user listens all the way through the content, that is preferably a feedback event, that is used to indicate a preference for the content. For example, if a user listens to only 5% of a segment, that may be used to indicate a dislike for that segment. Alternatively, if a user listens to 95% of the segment, that may be used to indicate a like for that segment.

In addition, if the end user selects more of the same type of content, that may be an indication that the user likes that type of content. At any time, the end user may select "more," in which case he is fed more information that is similar or relevant to that segment. Or, the user may select "more" and then be prompted to select from a list of relevant keywords selected keywords may then be used to retrieve additional content.

For example, a user hears a segment on great stocks that mentions Microsoft and Google; the user selects More>Google and then is fed more content specifically about Google. In addition, the user may select More> and then multiple keywords of which he wants more information about. For example, a segment on Microsoft may have the keywords "Bill Gates" as a possible More selection. The user may also be given an option to discontinue a "more" request once they are satisfied. The system is designed to automatically determine how and when to terminate "more" requests, such as to maintain "more" requests for a certain period of time and then gradually relax. Or, the user may specify how they wish to handle a request for "more".

Yet another method is the Save For Later feature. A user may select "Save for Later" which indicates a preference for that content not to delete it or mark it so that the system can locate and play it at a later date. Preferably, either a full or recent history of all segments and the corresponding reviews/feedback are available either directly in the player interface or on a webpage for review, or access at a later date.

"Go linear" is another feature. If a user hears a segment which is part of a series (e.g. 1 of 13), the user may choose to select to hear all 13 segments in order, thereby bypassing the dynamic selection methods and listening to content in an more traditional linear fashion (such as an audiobook).

Auditory commands are another feedback method One scenario is that a user has a microphone input method and can issue an auditory command for any of the feedback events. In addition, the user may use audio commands to control other aspects of the media experience, such as for requesting the content topics to be delivered.

Customer complaints may be used to regulate or monitor the content in the network. A user may select a "report complaint" option and then provide (via text box, menu, categories, voice command, or any other suitable input method) a complaint about a particular segment, such as: poor quality, in appropriate content, swear words, etc. The network may include a method to use aggregate user complaints to regulate the available content in the network automatically or through human intervention. In addition to the regulatory benefits of allowing complaints, complaint events may also function as feedback event, indicating preference. However, in some cases complaint events may not be used to indicate user's preference for that type of content. For example, a user might complain about bad sound quality of a news report. In that case, the complaint is not used to indicate a user's dislike for news in general, however that particular segment may receive a negative review.

Advertising feedback is another feature of the system that allows an advertiser to determine how advertisements performed overall and to specific types of users. Users are able to provide feedback on advertisements in the same format as they do content. (discussed further in advertising methods below).

Email information can enhance the content by providing the end user more information about a certain segment. One use is if a user wants to know more about the author of a segment he may select an "email me more" option and the network may send an email or facilitate an email to be sent about that content and the author or source of that content. The "email me more" feature may be used to deliver any type of suitable information as may be provided by the segment's author, the network and/or other users. The email address associated with user's profile may be used by default, or certain devices may allow for a user to specify a different email address to be used. The Email Me More function may be available for advertisements as well (discussed more detail in the advertising methods below).

These feedback methods generate feedback events which are preferably transmitted to the network. If an active connection is available to the network from the user's device or PC, these feedback events are preferably sent to the network immediately. If a connection is not available, the feedback events may be stored and then uploaded upon next connection.

Comments may be used to expand the content experience by making it more interactive and collaborative. Users provide comments on content segments. These may be like comments on a blog website. For example, if a scientist listened to a news segment on global warming, he may input his comments on that subject. These comments may be additional segments in the network, which may be uploaded using any of the methods available to input content into the network, except that they are preferably indicated as being tied to a particular predicating segment. These comments may then be delivered in conjunction with the referenced content segment. For example, if a user commented on a Presidential debate, that segment may be delivered to people who heard that presidential debate. In some cases, a user may upload a comment to be played before the relevant content segment. Social matching applies to comments the same way it does to other content so that only comments which were deemed relevant to a particular user are delivered to that user.

Users may choose to send comments to a particular user or users. For example, person A listens to a segment and then inputs a comment of, "hey sally, you are going to love this" and then sends that segment (with comment) to sally.

Users who are collaborators in a group input comments, which may be delivered to members of that group in conjunction with the related content segment. For example, Bill Gates makes a comment on a recent news story about software trend. It sounds like, "This is an interesting news story. I think the author makes some great points about why to . . . ". Anyone who subscribes to Bill's group may be fed that comment before reviewing the segment that follows Users may be given options to control how comments are delivered, such as but not limited to the following: 1. Users select to include or not include any comments; 2. Users select to only include comments from people in their buddy group or groups they subscribe to; 3. Users select how many comments to include for any given segment; Users select types of comments to include, such as preceding or succeeding comments; Users select to be prompted of available comments such that they only experience the ones the user selects to be played.

Advertising

Advertising methods are may be a revenue generator for the content provider and the network. Preferably, ads are included periodically through the listening experience (like traditional radio) for all users or users of certain subscription types. Ads may be between discrete segments and/or within segments. In the case of longer segments, the location may be randomly chosen or chosen by the content provider or a network administrator.

In order to control ad distribution, advertisers may choose to select the number of insertions for any given ad campaign. Or, advertisers may choose to select the total dollars to be spent for that ad campaign, such that once the ad campaign reached that point (roughly) of total dollars then the ads stops being inserted. Advertisers set these control parameters overall, or for a specific time period. For example, an advertiser may set their ads to run for 1,000 impressions every day or $5,000 a month. These limits may be as large or small as desired by the advertisers. Advertisers may select specific dates and/or times for their ads to run. Advertisers may choose to select certain geographic regions for their ads. Advertisers may choose to select certain profile types or to be run proximally located to certain types of content. The advertisers may use any and all of these control parameters in conjunction with each other to achieve a desired result. For example, an advertiser may set an ad to run from 9 to 11 am on Mondays through Fridays to users between age of 30-35, living in Chicago, who are listening to news content, with a max "spend" of $500 per day and $10,000 per month.

In some cases the cost to run advertisements in the network are set by the network. In many cases the network provides a bidding (or open marketplace) method whereby the advertisers set a price they are willing to pay for their target audience. Ads may then be placed based on the bidding prices.

There may be set ad lengths, or the ad lengths may be variable. In the case of set ad lengths, advertisers may create longer ads by using multiple ad insertions for a single ad (e.g. a one minute ad is created using two 30 second ad slots).

Advertisers may choose to specify geographic regions to be targeted, such as by city, state, zip, country, etc. or within a certain distance from a geographic points. Geographic location may be determined by the address associated with a user's profile or by GPS, cellular, or other triangulation method to determine the actual location of a user.

The network preferably allows advertisers to create ads in different languages that are then matched to users who have that language as an acceptable language in their profile. The system allows for the ad language to be different from the language of the content if both languages are allowed for a given user.

An option is available to the advertiser to have ads delivered subliminally (i.e. in a way that is not perceptible or minimally perceptible to the end user). The end user also has the option to allow or prevent subliminal ads. In the case where subliminal ads are allowed a user is provided an interface to view all ads that were delivered subliminally or notified in some way when a subliminal ad is running.

In cases where the device or PC is running the network provider software or a third party software, which uses the network provider methods, ad impression are preferably tracked once ads are played. Details about the successful delivery of an ad may be uploaded along with the feedback events each time the end user connected to the network. Details may include the ad that played, what content it was played with, who the user was, the time and date of the impression, and any other information that is useful in respect to that user or that ad. In the case of an iPod or similar device that does not allow for custom software, the exact advertisement impressions may not be known. In such as instance, the impressions may be extrapolated from the number of downloads or some other use of software to retroactively determine if an ad was played. For example, in the case of an iPod an application or plug-in may be used to scan the iPod database to determine if an ad was played. There may be a discount for estimated ad impressions. Users may not able to fast-forward over ads while listening on proprietary software. In the case of an iPod or similar mobile device, the user is able to fast-forward or skip ads altogether.

Preferably, users are able to give feedback on ads using the same feedback methods used to provide feedback on content segments. This may be used to better select ads for that person from the available ads targeting his profile and content. Preferably, network provides advertisers a method to measure the effectiveness of their ads based on the user feedback events (discussed in more detail below).

If advertisers desire, users of certain enabled devices may be given a "tell me more" option during an advertisement. If a user selects the "tell me more" option, the network preferably facilitates the delivery of more information. For example, additional audio or video may be played regarding the ad, company, product, and/or service. Or, the additional information may be delivered through another method of the advertiser's choosing, such as an email pertaining to that advertisement and offer. This method gives advertisers a highly-valuable immediate-response method.

There may also be a "buy now" immediate response method in which case a user who selects this option is agreeing to purchase or enroll in whatever was offered. The user's order, credit card, shipping/billing info, etc. are preferably relayed via secure method to the advertiser. Or, the network manages the financial transaction and pays the advertiser once there is confirmation of the products delivery or shipment, as to protect the user from fraudulent advertisers.

A dynamic ad targeting system may also be part of the system. For example, there may be a dynamic ad targeting system whereby an advertiser does not need to specify the exact target profile or content in which to deliver the ad. The system may start running the ads broadly and then target them based on the feedback from different profile and content types, selecting the best match for that particular ad. The advertiser may set the initial starting point very broad or more specific. Either way, the dynamic system preferably attempts to maximize the money spent on the ad by delivering ads to the most responsive users within the selected specifics. Ads may be targeted using any combination of the feedback events, "tell me more" request, "buy now" request, and any other suitable method. The dynamic targeting is an option available to advertisers for free, or it may be part of a premium advertiser subscription.

Ad monitoring is another optional feature of the system. A method may be provided for advertisers to monitor and manage the advertisement insertions and performance. Advertisers may see how their ads performed to various user profiles and content matches (based on feedback events, "tell me more" requests, "buy now" requests, etc., or any combination thereof). Advertisers may use this information to refine and optimize their ads.

Ad research is another optional feature of the system. Advertisers may be provided with access to the performance of ads of similar products, services, and companies. Companies may use this tool to see how other offers, products, and services, were performing in their target market.

A/B split testing is another optional feature of the system. Advertisers may be given the ability to create different versions of ads whereby their best ad runs after a set number of test insertions. Ad versions by the same advertiser are preferably setup whereby the best ad wins to whichever demographic or profile it performed best to. For example, an advertiser has two ads for the same service, A and B. Ad A does better to younger demographics and ad B does better to older set. In that case, both ads may remain active to the areas they outperformed the other but inactive in the areas in which the competitive ad was superior. The advertisement audio file may be inserted into the appropriate content segment file directly or downloaded/streamed as a separate file as needed.

Distributed Content Creation Network

One valuable service optionally provided to content creators is the ability to convert their print content into audio or audiovisual content for delivery via the Network. This may be done efficiently through the Network's distributed conversation network with minimal work by the original Content Creator.

A Content creator can input their text content including any supporting information, such as Title, Description, Meta Data, Keywords, etc. That text content may then be distributed to approve voice or video talents (hereafter "Talent"). The Talent then records the segment via a computer or telephone and the resulting file is stored on the Network servers for editing.

The Talent or another individual (or company) can then log into the online interface and edit the segment to a quality necessary for the content to be published. These "Editors" can be located anywhere in the world and can edit the content either by downloading the content to their local editing hardware/software and then uploading the finished product; or they can edit the content directly online via Networks provided editing web pages.

Once the content is recorded and edited the Content Creator has the ability to approve the content or request that changes be made. Once the content is satisfactory to the Content Creator the Content Creator will indicate it as being "approved" to be published through the Content Creator's chosen distribution methods (e.g. podcasts).

The Talent and Editors are preferably compensated per their agreement with the Network or with the Content Creator. Optionally the Content Creator can allow the Network to manage the payment by receiving the payment from the Content Creator and distributing the correct amounts to the Talent and Editors.

The Talent and Editors may be evaluated by the user community and the Content Creators and those who produce poor quality are removed from the system. Content Creators have the ability to select specific Talent from the available Talents. Or, the content can be matched to well-reviewed Talents based on the type of content. For example, a Content Creator can select an option on the Network System to match segments to Talents based on the type of content so that Sports content, for example, is recorded by sports-enthusiasts and other topics are recorded by people who have been well reviewed in that category.

Open Source Training

Training employees, such as sales representatives, is an expensive and difficult task for medium and large companies. And often the training solutions are general and not specific to particular individuals' tastes and needs. Furthermore, the distribution and management of the training is often difficult and costly and it is hard to monitor if they followed through and benefited from the training.

The present system improves upon traditional training methods. In this model companies create groups of Network Users (hereafter "Users") who have similar needs, such as the Sales group, Customer service group, etc. The groups can be as narrow and broad as the company desires.

The company then has the option to prescribe specific content to be delivered to the Users in those groups or prescribe topics they desire the groups to experience, or a combination thereof. The specific segments can be content proprietary to the company, such as a message from the CEO, a training piece, product announcement, etc. Or, they can be segments from the Networks aggregated content from external sources (external to the company), such as a Wall Street Journal interview with a successful business leader, or a publicly available segment on sales trends.

In the case where the content is topical rather than specific, the Network's content selection system may determine the best content for each group member based on their profile, feedback events, etc., within the scope of the prescribed topic. For example, the company may indicate the topic of "sales". The members of the group would then each receive sales content but each member would receive a sales segment deemed relevant to that person based on his or her profile. For example, one person may receive a segment on prospecting for clients using the internet because he has shown interest in internet and new technologies. Another user may receive a segment on negotiating because that is the area of sales she is most interested.

The company can indicate as many topics and as broadly or narrowly focused as desired. Additionally, the company can indicate how much time each person should spend experiencing content in the group (e.g. one hour per week). The Network then provides an interface for the company to review key data about the group, such as which segments and topics are popular, how much each member is experiencing.

The present system is generally related to a personalized network providing a source for digital multimedia, audio, video, audio/visual, such as podcasts, news, sports, comedy, pop-culture, technology, music, and more, delivered to an end user PC or mobile device via the Internet. The system and method using a computer network in which the system content from any content provider, such as a publisher, company, author, advertiser, independent author or user is delivered to individuals interested in certain multimedia content, such that the content providers earn money for the distribution of their content.

Content is preferably aggregated from external sources via the internet, such as RSS feeds, podcasts, audio posts, etc. as well. Additionally content may be inputted directly into the system by the content providers. Content is delivered to end users within the United States or any foreign country.

The network provider utilizing the present invention creates automatically or manually a valid combination of alpha, numeric, or other characters to select a unique valid personalized UserID and password that identifies the end user on the system.

The user provides information about himself, such as demographics, likes, dislikes, etc. They system uses this information to create a profile for this user.

Multimedia content is preferably selected from internal and external content available based on the users' profile, preferences, and specific requests. Additionally the user may be compared to similar users to determine multimedia content to deliver to the user. The selected content is preferably delivered to the user's computer or mobile device via streaming or downloading. The user can experience content from certain sources for free with periodic advertisements or the user can select a subscription to access additional premium content, which would also have periodic advertisements. However, the user could also choose a more expensive subscription which allowed access to the free and premium content but without any advertisements. This user would then have access to network content from any enabled computer, application, or device by entering his user ID and password.

If a constant connection to the Internet is available to facilitate streaming audio, the best audio segments (as determined by the system for this user) are streamed to the user based on the user's current listening requests and best socially matched content. If a constant connection is not available, content is downloaded to the device in the background for play later.

One method is when a connection is available, the device uploads the user preferences and feedback events (described below), the system then determines the best content based on the social matching system (as described in more detail above) and returns which new segments to download and which segments that currently exist on the device are deleted. The device may then download those segments as long as a connection is available. If the connection is lost, the process preferably starts over again upon the next connection, or it continues the previous download set before requesting a new set. This all happens in the background while the user is listening to content already on the device or using the device for some other purpose.

In the case of a download device, where it operates without direct connection to the network, the device includes logic whereby it further refines what segments are most appropriate for that user at that time based on the available content on the device based on recent user feedback events.

In some cases a "hot sync" with a computer or other hardware is used to upload the feedback events and download the segments. An example is a device that does not have Wi-Fi or wireless data ability and uses a connection to a computer to connect to facilitate a connection to the network.

One factor in a user's profile is preferred acceptable languages. Only content in those languages is then selected and delivered to that user. Users specify a single language or multiple languages.

Turning now to the figures, the present system is most readily realized in a network communications system. A high level block diagram of an exemplary network communications system 100 is illustrated in FIG. 1. The illustrated system 100 includes one or more client devices 102, one or more wireless routers 104, one or more media servers 106, and one or more database servers 108 connected to one or more databases 110. Each of these devices may communicate with each other via a connection to one or more communications channels 116. The communications channels 116 may be any suitable communications channels 116 such as the Internet, cable, satellite, local area network, wide area networks, telephone networks, etc. It will be appreciated that any of the devices described herein may be directly connected to each other and/or connected over one or more networks.

In an example mode of operation, users 118 of the system 100 consume one or more media files received from the media server 106. The media files may be any suitable type of media file such as an audio file, a video file, and/or a multimedia file. The media files preferably include advertising content and non-advertising content.

One media server 106 may interact with a large number of client devices 102. Accordingly, each media server 106 is typically a high end computing device with a large storage capacity, one or more fast microprocessors, and one or more high speed network connections. Conversely, relative to a typical media server 106, each client device 102 typically includes less storage capacity, less processing power, and a slower network connection.

Figure 2:
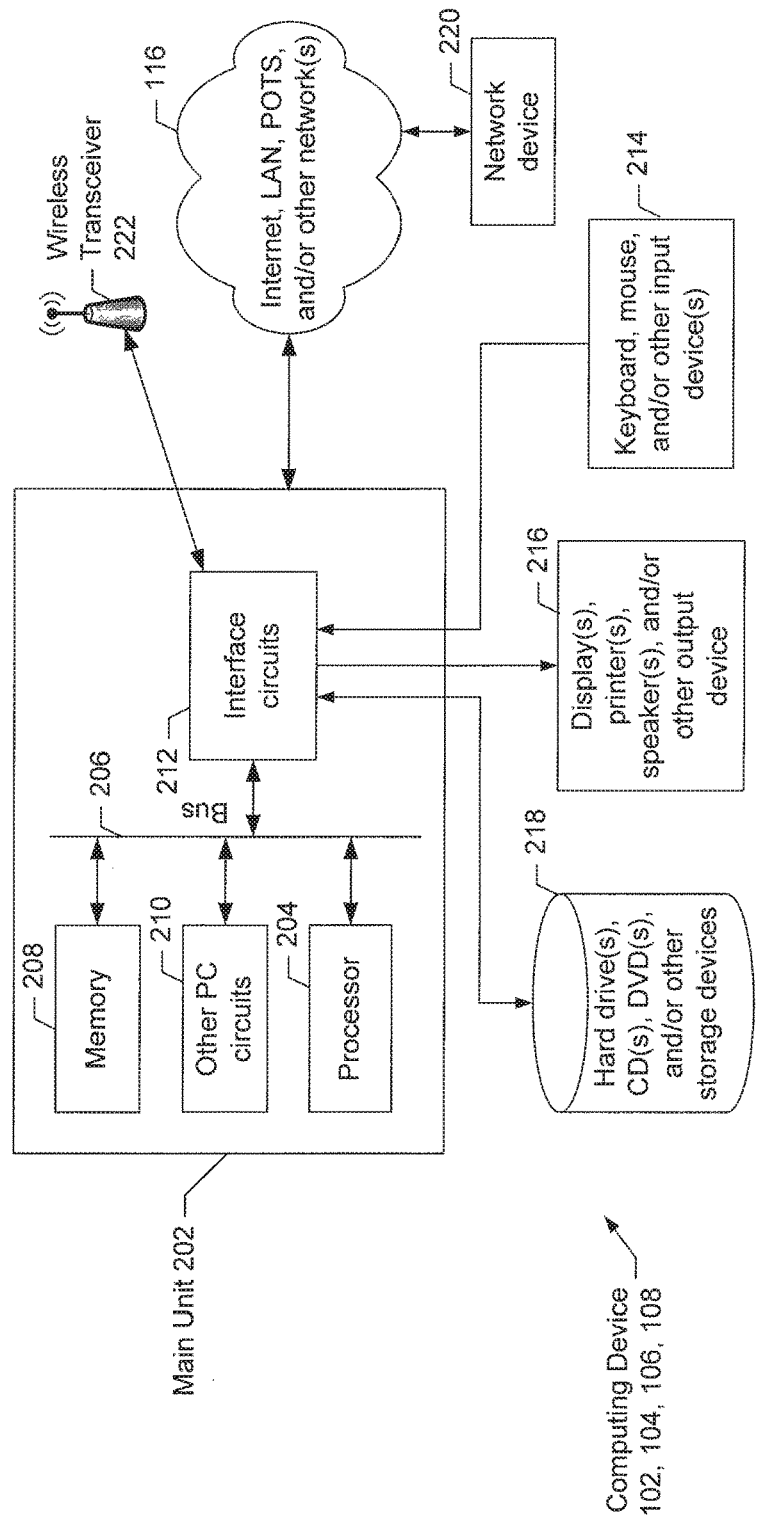
FIG. 2 is a more detailed block diagram showing one example of a computing device.

A detailed block diagram of an example computing device 102, 104, 106, 108 is illustrated in FIG. 2. Each computing device 102, 104, 106, 108 may include a server, a personal computer (PC), a personal digital assistant (PDA), a portable audio player, a portable audio/video player, a mobile telephone, a television remote control and/or any other suitable computing device. Each computing device 102, 104, 106, 108 preferably includes a main unit 202 which preferably includes one or more processors 204 electrically coupled by an address/data bus 206 to one or more memory devices 208, other computer circuitry 210, and one or more interface circuits 212. The processor 204 may be any suitable microprocessor.

The memory 208 preferably includes volatile memory and non-volatile memory. Preferably, the memory 208 and/or another storage device 218 stores software instructions that interact with the other devices in the system 100 as described herein. These software instructions may be executed by the processor 204 in any suitable manner. The memory 208 and/or another storage device 218 may also store one or more data structures, digital data indicative of documents, files, programs, web pages, etc. retrieved from another computing device 102, 104, 106, 108 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 104, 106, 108. For example, the display 216 may be used to display web pages received from the media server 106. The visual displays may include prompts for human input, run time statistics, calculated values, data, etc.

One or more storage devices 218 may also be connected to the main unit 202 via the interface circuit 212. For example, a hard drive, CD drive, DVD drive, flash memory drive, and/or other storage devices may be connected to the main unit 202. The storage devices 218 may store any type of data used by the computing device 102, 104, 106, 108.

Each computing device 102, 104, 106, 108 may also exchange data with other computing devices 102, 104, 106, 108 and/or other network devices 220 via a connection to the communication channel(s) 116. The communication channel(s) 116 may be any type of network connection, such as an Ethernet connection, WiFi, WiMax, digital subscriber line (DSL), telephone line, coaxial cable, etc. Users of the system 100 may be required to register with the media server 106. In such an instance, each user may choose a user identifier (e.g., e-mail address) and a password which may be required for the activation of services. The user identifier and password may be passed across the communication channel(s) 116 using encryption built into the user's browser, software application, or device. Alternatively, the user identifier and/or password may be assigned by the media server 106.

Figure 3:
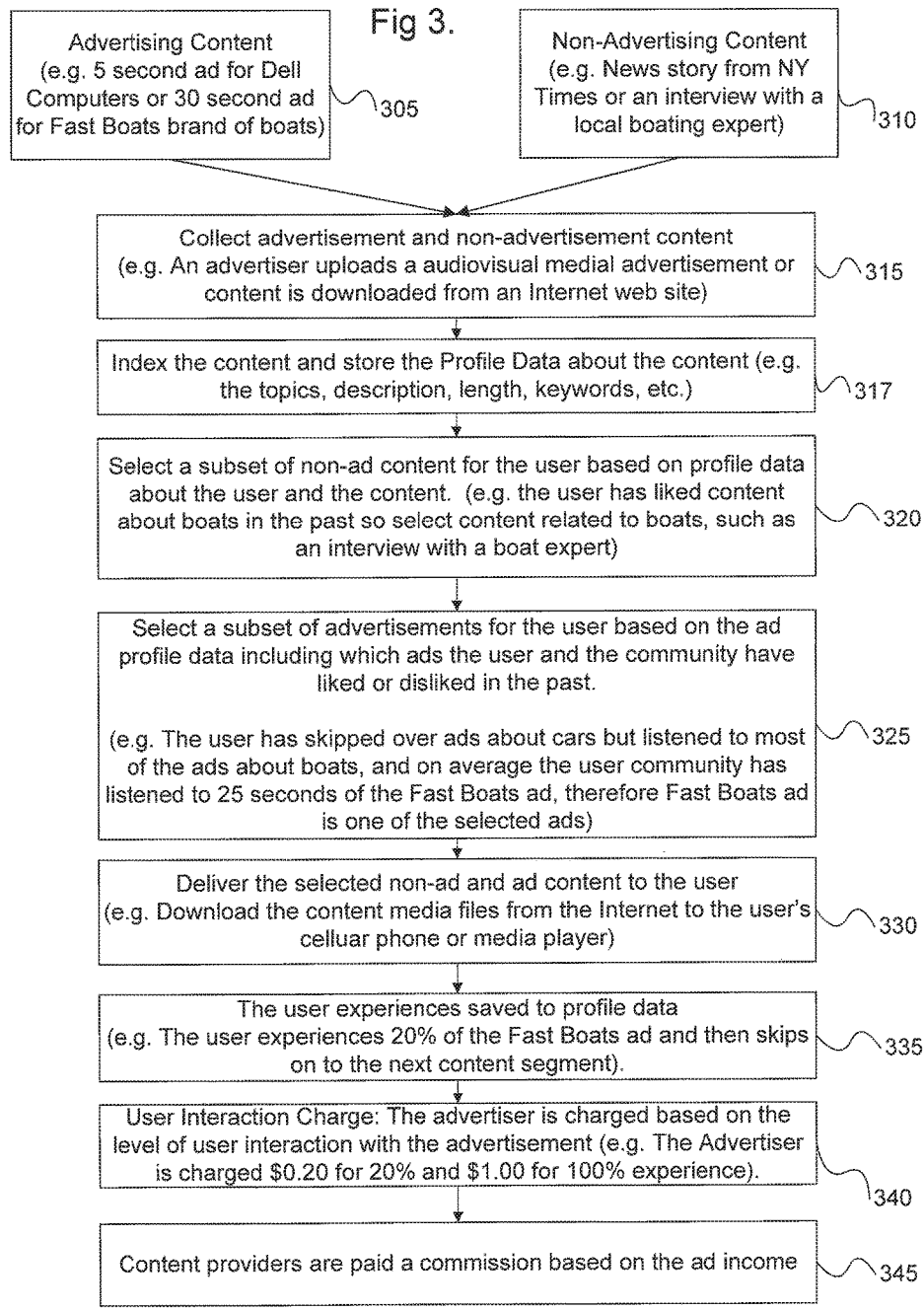
FIG. 3 is a flowchart showing one example of a system for delivering content to a media player.

A flowchart of an example process 300 for delivering content to a media player is presented in FIG. 3. Preferably, the process 300 is embodied in one or more software programs which is stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, and some of the steps described may be optional.

Advertising content 305 and Non-Advertising content 310 are collected (shown by box 315). Examples of advertising content (also referred to as "ad content") could include a promotion for a new line of Dell Computers or an advertisement for Fast Boats brand of boats. Advertisements can be have varying durations as desired by the advertiser. In the example of FIG. 3, Dell computers has chosen to create a 5 second ad and Fast Boats has decided to create a longer 30 second advertisement.

Examples of non-advertising content (also referred to as "non-ad content") could include text articles, such as a news story from NY Times, a segment from CNN TV, or a video interview with an expert on boating.

Various segments of ad and non-ad content, represented by 305 and 310 respectively, are collected 315 through various methods which could include an advertiser, advertising agency, publisher, or content owner uploading digital copies of the content to an Internet website. It could also be collected by a software application often called a "web crawler" or "spider" which searches Internet websites for desirable forms of ad and non-ad content and then downloads those segments.

Once the segments are collected, details about the content are stored—a process often called "indexing" and is represented by box 317. The collection of data about the segments can be referred to as Profile Data and could include information about the specific segment such as media file length, size, duration, title, topics, description, keywords, etc. Additionally Profile Data can include related information about the content, such as what types of users like or dislike the content or how many people have experienced the content. For example, an ad content segment profile might indicate that it is 30 seconds in length, on the topics of boats and boating. Additionally, the profile data might indicate that 75% of users interested in boating experienced at least 90% of the full advertisement duration before skipping to the next segment and 50% of users interested in cars skipped over the advertisement after listening to only 10%. The profile data might further interpret these results to indicate that this advertisement should be delivered to users who are interested in boating but should not be delivered to users who are interested in cars.

Similarly, users and user groups may have Profile Data associated with them, such as their likes and dislikes, which in conjunction with the ad and non-ad content profile data help determine what content should be delivered to a particular user or group. For example, if a user has requested news content, watched boat shows, skipped over content about cars, and watched advertisements about boat companies, that user's profile data might indicate a preference for content on news and boats. Further, the user's profile may include a dislike for content about cars, and the user's profile may indicate a preference for advertisements related to boating, and specifically advertisements about boat companies.

Once the Profile Data for the ad and non-ad content is assembled, those segments are preferably available to be delivered to users. Box 320 represents an example selection of an appropriate subset of non-ad content based on the profile data about the available content and the profile data about a particular user. For example, in addition to news, politics, and other topics, a user's history demonstrates that he watches an average of 75% of the duration of content segments relating to boating. The system may infer that the user likes content on boating. Consequently, the subset of non-ad content selected for the user by the system may include at least one available boating non-ad content segment, such as an interview with a boating expert.

In addition to the subset of non-ad content selected for a given user, box 325 demonstrates that a subset of ad content may also be selected for the user based on the user profile and ad content profiles so that the most appropriate advertisement is delivered which will have a good chance of being liked, and therefore not skipped, by the user. For example, if a user has skipped over ads about cars, but on average has listened to at least 50% of the respective durations of ad content about boats, and the community of users with similar boating desires who have also skipped over the car ads has listened to on average 25 seconds of the full 30 seconds of the Fast Boats brand boat ad, the system may infer that the Fast Boats ad would be more appropriate for this particular user. Therefore, the subset of ad content delivered to this user would likely include the Fast Boats brand ad content.

The ad and non-ad content may then delivered to the user, as indicated by box 330. Delivery may include the downloading of the ad and non-ad content to a user's media player, such as computer, mp3 player, iPod, cell phone, or PDA. The content may be delivered as separate digital media files for each ad and non-ad segment respectively. Or, the delivery may include the merging of certain ad and non-ad content into single files. For example, the Fast Boats advertisement may be merged onto the end of the boating expert content segment so that if a user transfers the non-ad content segment to a media player, the ad content will be included automatically.

As indicated by box 335, as the user experiences part or all of the ad and non-ad content, the duration of experience relative to each content segment is stored as part of the user's profile and the profile of the respective content segment. For example, if the user experienced 20% of the Fast Boats advertisement, that experience data may be stored as part of the Fast Boats profile as well as the user's profile.

Further, as indicated by box 340, the advertiser may be charged based on the level of user interaction (also referred to as "User Interaction Charge") with the advertisement. For example, if an advertiser is to pay $1.00 for all users who experience 100% of an advertisement, the advertiser may be charged a lesser amount (e.g. $0.20) for users who experienced 20% of the advertisement and then skipped on to the next content segment.

As indicated by box 345, the content providers may also be "commissioned" for non-ad content experienced by the user proximal to ad content experienced by the user which generated a "user interaction charge." For example, if a user's session included 9 minutes of the boat expert segment followed by 1 minute of a News segment and during that same session a User Interaction Charge of $0.20 is generated, the boat advertiser may receive %0ths or 90% of the available commission earned on the User Interaction Charge because 9 minutes of the user's total 10 minutes (or 90%) was from the boat expert interview segment.

Figure 4:
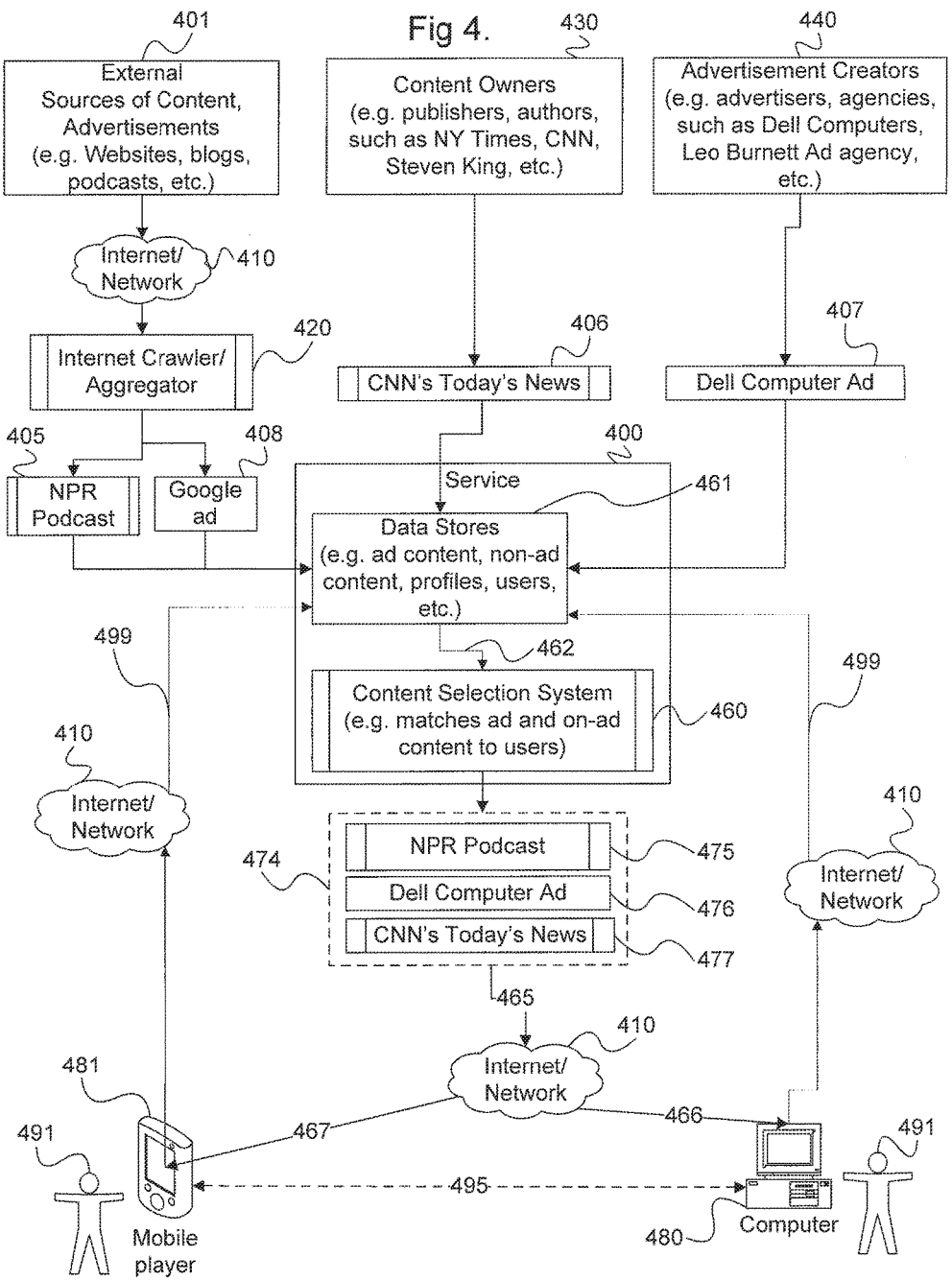
FIG. 4 is block diagram of an example system for delivering content to a media player.

The Service 400 preferably collects ad and non-ad content from various sources and stores them in various Data Stores 461 (a process often referred to as "aggregating"). Content could be aggregated from External Sources as shown by box 401, such as a website, blog, podcast, etc. These external sources may be accessed via a network or Internet 410. In the case of content sources being located on the Internet, an Internet Crawler 420 may be used to find them. FIG. 4 shows two content segments found by the Internet Crawler 420, specifically an NPR Podcast 405 and a Google advertisement 408. In this example, the Crawler 420 downloads the respective content to the Content Stores 461 of the Service 400.

Additionally Content Owners 430 and Advertisement Creators 440 may upload or otherwise input content and advertisements respectively into the Data Stores 461 of the Service 400. Examples of Content Owners include publishers such as NY Times and CNN as well as content creators and authors, such as Steven King. In the example of FIG. 4, the Content Owner CNN has uploaded a content segment called CNN's Today's News 406.

Examples of Advertisement Creators include any person, company or institution who wants to input an advertisement into the Service 400, such as Dell Computers or Leo Burnett Ad Agency. In this example Dell Computer company has uploaded an advertisement 407 to the Service 400.

The Ad and Non-ad content may then be stored in the Data Stores 461 of the Service 400. A Profile is preferably created for each piece of content as part of the Data Stores 461. These Profiles may include such things as length, title, topics, keywords, as well as how well they are liked or disliked by the user community. The Data Stores 461 may further store Profile Data on the various users who use the Service 400, such as what types of content they like and dislike, what types of ads they like and dislike, what groups they are part of, who they share content with, what content types and subjects were requested by the user, etc.

The Content Selection System 460 may then use (as shown by line 462) the Profile Data stored in the Data Stores 461 to select ad and non-ad content for the users of the service 400.

In FIG. 4, the Content Selection System 460 has selected three segments 475, 476, and 477 to deliver to user 491 as part of user experience session 474. A user experience session may consist of all the content that a user experiences over a given period of time. In the example of FIG. 4, this user only has time to listen to three segments. If the user had time to listen to more, they may be part of the same content experience session or a different content experience session.

The three segments selected for user 491 are an NPR podcast episode 475, a Dell Computer ad 476, and a CNN's Today's News episode 477. Each of these episodes was selected for user 491 by the Content Selection System 460 from the available ad and non-ad content in the Data Stores 461 based on the user's 491 profile and the profiles of the content in the Data Stores, which includes the profiles of the three selected segments 475, 476, and 477. For example, the NPR Podcast episode 475 and CNN's Today's News segment 477 may have been selected because the user has specifically requested news content and further has shown preference for liberal news content. Therefore content in the Data Stores 461 is not selected which has corresponding profile data in the Data Stores 461 and for which the corresponding profile data indicates that the content is more conservative than user 491 prefers, per the user's 491 profile data.

The content segments of content experience session 474 can be delivered to user 491 via a network or Internet 410, as shown by line 465. The content segments can further be delivered to the user's 491 computer 480 and/or the user's 491 mobile player 481, such as iPod, PDA, Cell phone, or other mobile device capable of playing the content segments 475, 476, and 477.

Some devices may be incapable of playing some types of content segments. For example, if content segment 475 is audio format and content segment 477 is video format and the user's 491 player 481 is not capable of playing video content, the Content Selection System 460 may only deliver the capable segments to that device. However, a device, such as the computer 480, which is capable of playing more media formats, would receive both audio and video formats.

Further, if the mobile player 481 may not be equipped for direct connection to the network or internet 410, it may download (or "sync") content from another network-enabled device such as the computer 480 as represented by dashed line 495.

As user 491 partially or fully experiences the delivered content segments 475, 476, and 477, the data about the respective experiences (e.g. how much of the content was experienced, was the segment skipped, what order the segments were experienced in, etc.) is preferably uploaded to the Service 400 via a network or internet 410 as shown by lines 499. If a media player is not capable of connecting to the Service 400 via a network or internet 410, the media player can transmit the experience data to a capable device, such as a computer 480, as indicated by dashed line 495, whereby the computer may then upload the experience data to the Service 400. The experience data may then be stored by the Service 400 in the Data Stores 461 and used by the Content Selection System 460 for future content experience sessions for user 491 as well as other users whereby the experience (e.g. likes and dislikes) is helpful in selecting content for other users.

Figure 5:
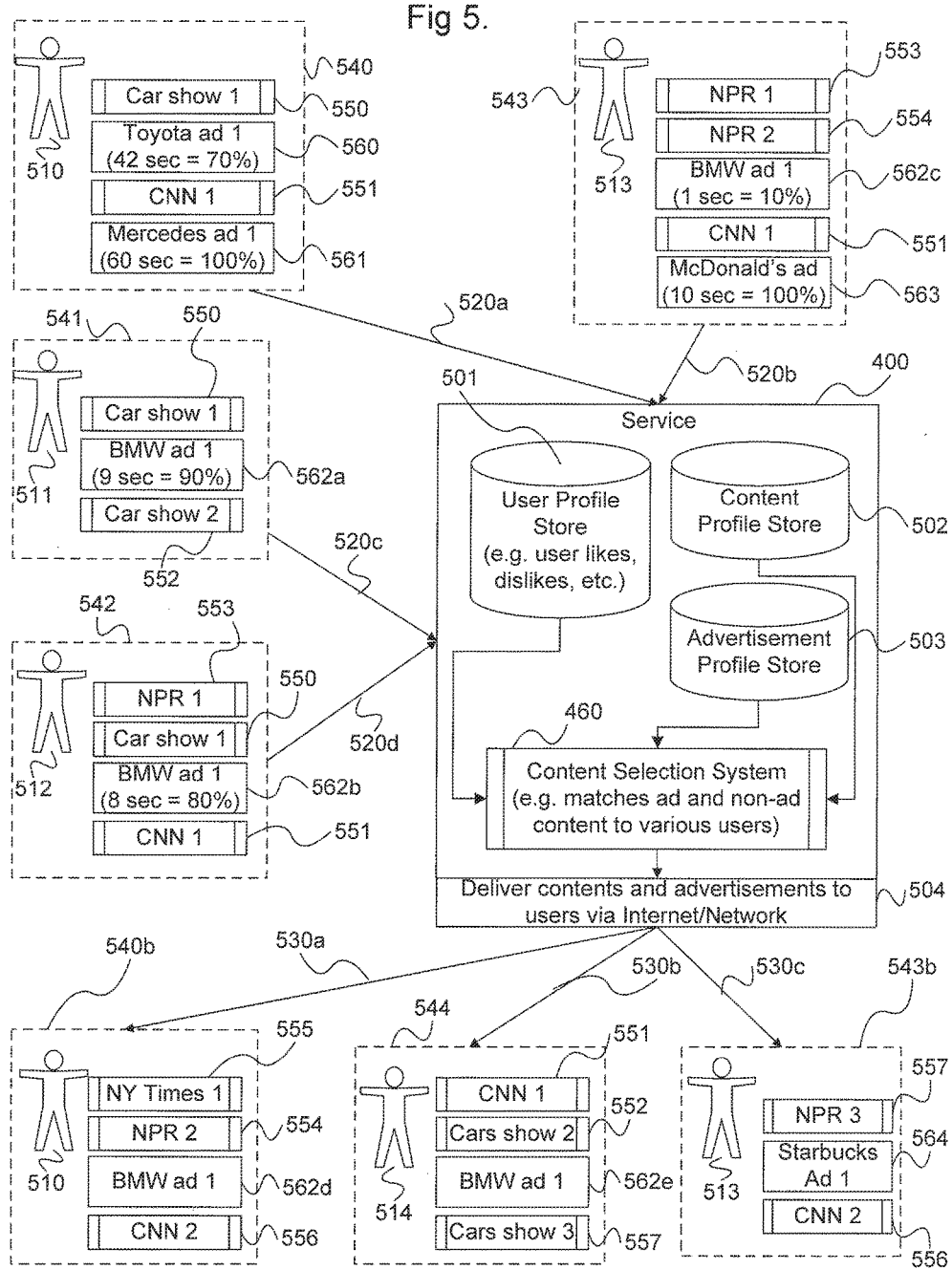
FIG. 5 is block diagram illustrating an example of with five users interacting with the system.

FIG. 5 illustrates how five users 510-514 could interact with the Service 400, including how their respective preferences and the collective preferences of other users for ad and non-ad content may affect what content is delivered to each user.

In this example, user 510 has received and experienced a series of ad and non-ad content segments, collectively 540, from the Service 400. The first segment experienced is a non-ad segment Car Show 1 (550) followed by a Toyota ad 560, which the user experiences 42 seconds (or 70%) of the full duration of the advertisement. Subsequently, the user experiences a non-ad CNN segment 551 followed by Mercedes ad 561, which the user experienced for 60 seconds which was the full duration of the ad content. The experienced durations of each segment is then sent back to the Service 400, shown by line 520*a*. Relevant experience data is may then be stored in the User Profile Store 501, Content Profile Store 502, and Ad Profile Store 503 as appropriate. For example, the user's 510 Profile may be updated to reflect that he experienced Car Show 1 (550) and CNN 1 (551) and therefore may like similar content in the future.

Additionally, the durations of the ad content 560, 561 experienced may be stored in the Ad Profile Store 503 so that the Service 400 can properly determine how much to charge the respective advertisers for ad impressions 561 and 560 and help the Service 400 determine which ads to deliver to other users.

For example, this data may be stored in the Ad Profile Store 503 that people who like content like Car Show 1 (550) and content from CNN (551) may also like car ads because both ad 560 and 561 were car ads and the user 510 experienced the majority of those ads. Additionally this data may be stored in the Ad Profile Store that users who like an ad from Toyota may also like ads from Mercedes.

In this example, user 511 has received and experienced content segments in dashed box 541 which includes Car Show 1 (550), a BMW ad (562*a*) and Car Show 2 (552). User 511 experienced 9 seconds (or 90%) of the BMW ad, represented by 562*a*. The Profile data for each ad and non-ad content may then be sent to the Service 400, as shown via line 520*c*.

In this example, user 512 also receives the same BMW ad as user 511 and user 512 experienced 8 seconds (or 80%) of the BMW ad, represented by 562*b*. Additionally, user 512 receives and experiences a series of content segments within the same experience session, denoted by dashed box 542. The content segments received by user 512 are an NPR segment (553), Car Show 1 (550), and CNN 1 (551). As shown, Car Show 1 (550) is also one of the content segments experienced by user 511. The experience data may then be sent to the Service 400 via line 520*d*. The User Profile data may include data that user 512 and user 511 have liked the same Car-related content, Car Show 1 (550), and both users have also liked the same advertisement for BMW, BMW ad 1 (562*b*), as indicated because both listened to most of the advertisement. The assumption that users who like Car-related content also like the BMW ad may be stored in the Advertising Profile Store 503. Further, the assumption that users who liked the BMW ad also liked the specific Car-related episode, Car Show 1 (550) may be stored in the Advertising Profile Store 503. The Advertising Profile Store data can then be used to select ads for other users.

In this example, user 513 also receives the BMW ad 1 as part of the content experience session denoted by dashed box 543, however, unlike users 511 and 512, user 513 did not like BMW ad 1 as indicated by ad content box 562*c* in which user 513 is shown to have only experienced 1 second (or 10%) of the BMW ad. Additionally, during that same content experience session 543, user 513 also receives and experiences three news segment, NPR 1 (553), NPR 2 (554), and CNN 1 (551). Additionally, user 513 is delivered a McDonald's advertisement of which he experienced 10 seconds (or 100%) of the advertisement, as indicated by advertising content box 563.

Preferably, this experience data is then sent to the Service 400 as indicated by line 520*b*, which may include the specific likes and dislikes of user 513 as well as data relevant to the experienced advertising and non-advertising content of session 543. For example, since user 513 liked content from NPR as well as CNN, the User Profile Store 501 may reflect this user's preference for news content. And, the Content Profile Store 502 may be updated to indicate that users who like NPR may also like content from CNN. The user's dislike for the BMW advertisement may be stored in the User Profile Store 501 as well as possibly in the Advertisement Profile Store 503 indicating that consumers of news content may not like ads related to cars or specifically ads related to BMW cars. This assumption may then be verified with additional user experiences. Additionally, the Ad Profile Store 503 may indicate that user 513 liked the McDonald's ad 563 and therefore may like additional ads about McDonald's and/or similar ads, such as ads related to other food and beverage companies. The Ad Profile Store 503 may also be updated to indicate that consumers of news content may like ads for McDonalds and may also like similar ads.

The Content Selection System 460 of the Service 400 then leverages the data available to it in the various Stores, such as the shown User Profile Store 501, Content Profile Store 502, and Advertisement Profile Store 503 to determine what ad and non-ad content to deliver to the users of the Service 400. Once the content is selected for a given user it is delivered to the user via a wired or wireless network, such as the Internet, as shown by box 504. Lines 530*a*, 530*b*, and 530*c* indicate the delivery of content to users 510, 514, and 513 respectively.

In this example, the Content Selection System 460 has determined that user 510 is interested in news content and has therefore delivered segments: NY Times 1 (555), NPR 2 (554), and CNN 2 (556). As indicated above, because user 510 has shown a preference for Car-related content (e.g. 550) and Car-related advertisements, specifically Toyota Ad 1 (560) and Mercedes ad 1 (561), the Content Selection System 460 has chosen a car-related advertisement, specifically BMW ad 1 (562*d*) because this particular ad had done well with users who liked car content, such as user 511 as well as users who liked car and news content, such as user 512. If user 510 had not shown a previous interest in car-related content as shown in experience session box 540, the Content Selection System 460, may have determined that like user 513, user 510 should not receive the BMW ad because it was not liked by user 513 who also likes news content similar to that of user 510. Therefore, it can be seen how the Content Selection System 460 of the Service 400 can leverage the previous experiences of content and advertisements of the particular user and other similar users to determine a good mix of new ad and non-ad content.

User 514 receives two Car-related content segments, Car Show 2 (522) and Car Show 3 (557), as well as a news segment, CNN 1 (551) as part of content experience session 544. The Content Selection System 460 has further selected the BMW ad 1 advertisement 562*e* because similar users 511 and 512 had previously demonstrated a preference for car ads and specifically the BMW ad 1 advertisement.

User 513, having previously experienced news content during content experience session 543 is subsequently delivered more news content, namely, two news segments, NPR 3 (557) and CNN 2 (556) as part of content experience session 543*b*. Because user 513 had shown a previous preference for a McDonald's ad (563), the Content Selection System 460 has selected a similar advertisement in the food-related industry, namely a Starbucks Coffee company advertisement Starbucks Ad 1 (564).

Once users 510, 514, and 513 experience the ad and non-ad content delivered in content experience sessions 540*b*, 544, and 543*b* respectively, the results of their experiences (e.g. likes, dislikes, partial and full experiences, etc.) are preferably sent to the Service 400 and stored in the relevant data stores. This new experience data may further improve the data available to the Content Selection System 460 to select content for users 510, 514, and 513, as well as the rest of the users of the Service 400.

Figure 6:
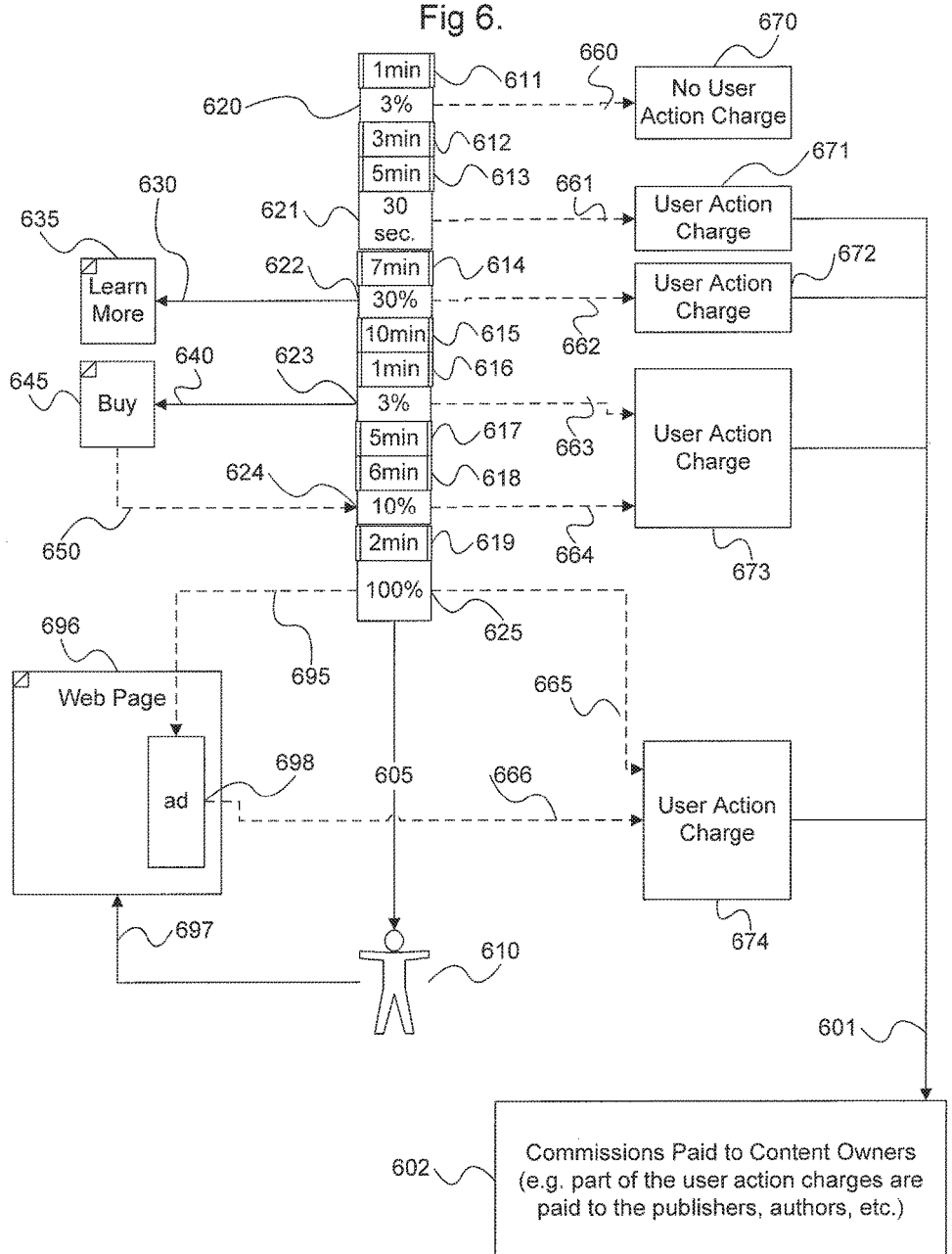
FIG. 6 is block diagram illustrating an example for charging advertisers and paying content providers.

FIG. 6 includes an example content experience session of user 610 which demonstrates one method for charging advertisers based on the level of user interaction with their respective advertisements. Additionally, FIG. 6 demonstrates how content owners may be paid commissions from the advertising income.

User 610 has a content experience session comprised of non-ad content segments 611-619 and advertising segments 620-625. For each ad segment 620-625 the user 610 has interacted with the advertisement to some degree. In some cases the advertisers may be charged for ad impressions regardless of user interaction. However, for this example the user interaction must be of a sufficient nature to result in the advertiser being charged for the advertisement impression. The resulting charge to the advertiser for such user action is called the User Action Charge.

The first advertisement received by user 610 is ad segment 620. The user listens to 3% of ad 620 and then skips on to the next segment in the experience session. For this example, experiencing 3% of the full duration of an advertisement does not trigger a User Action Charge as indicated by dashed line 660 and box 670.

The next ad to be experienced by user 610 is ad 621. User 610 experiences 30 seconds of ad 621 which, although it may or may not comprise the full duration of ad 621, is sufficient to trigger User Action Charge 671 as indicated by dashed line 661.

The user 610 then experiences ad 622, of which he experiences 30% of the full duration. Additionally, during ad 621, the user is provided a "learn more" option. User 610 selects the learn more option, such as by clicking on a hyperlink (shown by line 630) to visit a related website 635 which displays additional information about the product advertised in ad segment 622. The user having experienced 30% of ad segment 622 and also selecting the learn more option 635 has collectively triggered the User Action Charge 672 as indicated by line 662. Although user 610 only experienced 30% of the full duration of advertisement 622, because he also selected the learn more option 635, the advertiser of ad segment 622 may be required to pay a premium amount for the collective User Action.

The user 610 later experiences advertisement 623. User 610 experiences only 3% of advertisement 623 but he also selects a "buy now" option as illustrated by line 640 in which the user is taken to an ordering interface 645 where the user 610 can immediately place an order for the product advertised in ad segment 623. Although as indicated earlier in this example, 3% is not sufficient to result in a User Action Charge. However, because the user selected the buy now option 645, the advertiser is charged for the User Action. However, in this case the advertiser of ad segment 623 has set up an advertising Campaign such that the buy now option 645 triggers a subsequent advertisement later in the user's 610 experience session, or subsequent experience session. In this example, the subsequent ad segment 624 is delivered because of the buy now option, as indicated by dashed line 650. The user 610 then experiences 10% of ad segment 624. The advertiser of ad segments 623 and 624 is then charged User Action Charge 673 which reflects the 3% experience of ad segment 623, the buy now action 645, and follow up ad insertion 624. It is likely that the User Action Charge would reflect a premium for the follow up advertisement segment 624 because the user 610 is a "qualified" individual as indicated by his "buy now" action 645.

The final ad experienced by user 610 during this example content experience session is ad segment 625, of which user 610 experiences the full duration of the advertisement 625. Per the owner of advertisement 625, the complete experience of ad 625 results (shown by dashed line 695) in a follow up advertisement 698 on a web page 696 which the user 610 later visits. For example, if the user 610 visits a website (as indicated by line 697) to manage his content subscriptions, the online advertisement 698 would be displayed on one of the website management web pages 696, possibly as a banner advertisement. The owner of ad segment 625 and online ad banner 698 is consequently charged User Action Charge 674 which reflects the full experience of ad 625 (as shown by dashed line 665) and the additional charges (as indicated by dashed line 666) for running of the banner advertisement 698 on the web page 696.

In this example, the Content Owners of the non-ad content segments 611-619 receive commissions on the advertising income from the related advertisements. In some cases the content owners may be paid on advertisements proximally located to the content segment, such as if an ad comes within a predetermined number of minutes before or after the content segment. In this example, the content providers are paid (as indicated by line 601) a portion of the total ad revenue resulting from the collective User Action Charges 671, 672, 673, and 674. The collective commissions paid is represented by box 602.

One available method for determining how much of the total available commissions 602 each content provider receives is to pay the content providers based on what portion of the total non-ad content segments the user experienced during a single user experience session. In this example, the user experienced 1, 3, 5, 7, 10, 1, 5, 6, and 2 minutes of the non-ad content segments 611, 612, 613, 614, 615, 616, 617, 618, and 619 respectively. Consequently the total amount of non-ad content experienced by user 610 during this example content experience session is 40 minutes. The content owners of segments 611, 612, 613, 614, 615, 616, 617, 618, and 619 would receive the following portions of the total available commissions respectively; 1/40, 3/40, 5/40, 7/40, 10/40, 1/40, 5/40, 6/40, and 2/40.

Figure 7:
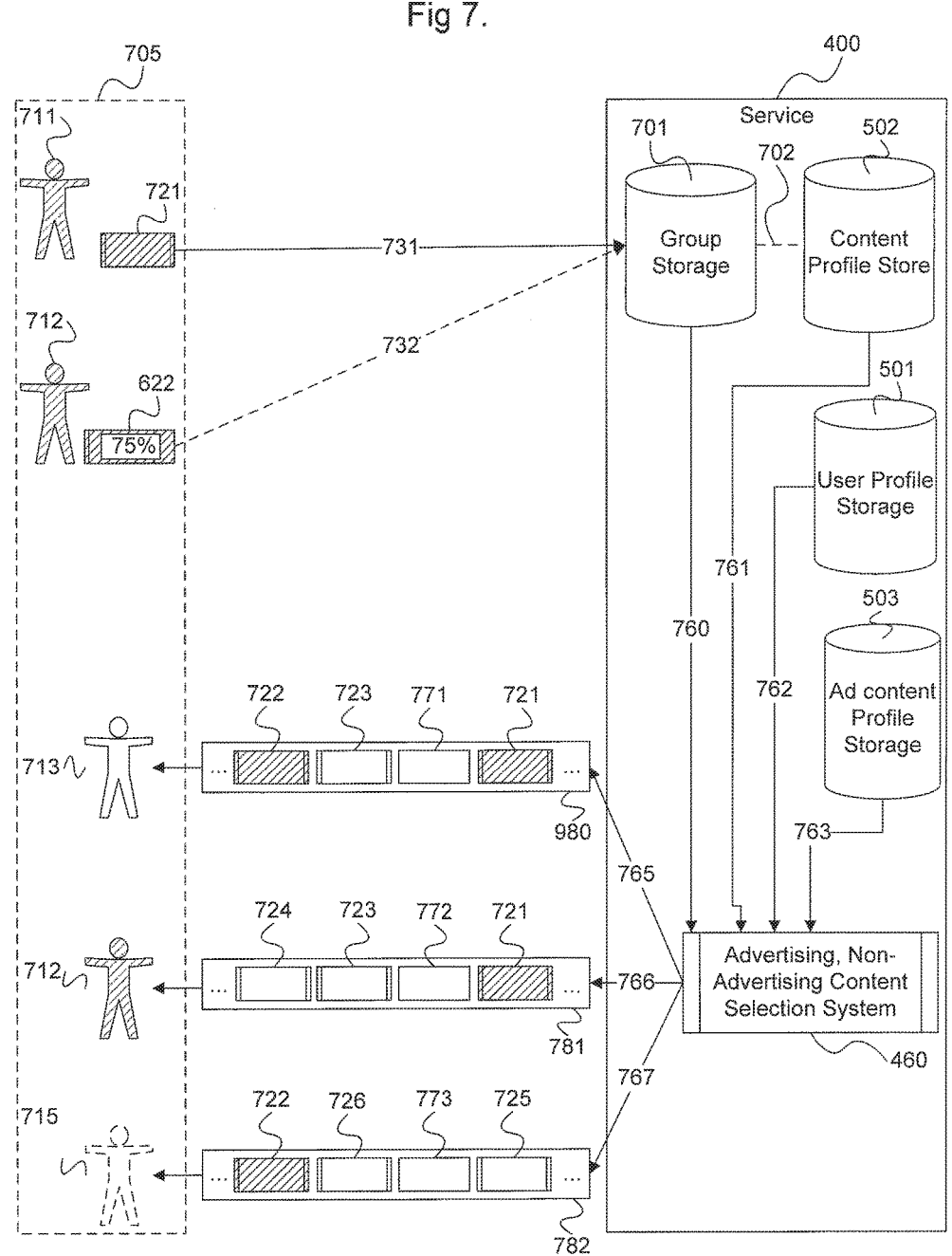
FIG. 7 is block diagram illustrating an example of a group of users sharing content with each other.

FIG. 7 demonstrates how a group can be created for users to share content with each other and/or the user community. In the example of FIG. 7, a group 705 has been created so that users can share content with each other. For example, if two users both like content about car racing, they can create a group to share their favorite car racing segments with each other and other users in the user community who are interested in similar content.

Group 705 is shown to include two contributing members denoted by dashed FIGS. 711 and 712 and several non-contributing members 713 and 715. Collectively users 711, 712, 713, and 715 make up the current members of the group.

The contributing members are members who can directly control or passively effect the content delivered to the members of the group. Contributing member 711 is shown to be actively contributing content segment 721 to the Group Data Store 701 via line 731. For example, if member 711 liked a particular segment, content source, or topic on racing he can take an action, such as clicking an "add to group" hyperlink on a webpage, to add (shown by line 731) the desired content 721 to the group 705. The relationship between the group 705 and the new content 721 may be stored in the Group Data Store 701 which is a data store which stores data related to each group in the Service 400. Additional related information may be stored in the Content Profile Store 502 indicated by dashed line 702.

Contributing members can also contribute content segments to the Group through passive means, such as by experiencing a duration of content that would indicate that the content is good enough to be contributed to the group. For example, if a contributing member experienced 100% of a content segment on the topic of a particular group, the Service 400 may automatically store that segment as part of the group content, per the desires of group's contributing members. In this example, contributing member 712 of group 705 is shown to have experienced 75% of content segment 722 which based on the settings of group 905 is determined to passively contribute content segment 722 to the Group Store 701 via dashed line 732.

Groups can also consist of non-contributing members who have actively joined the group by taking some deliberate action (e.g., by clicking on a hyperlink on a web page), or the Service 400 can assign members to groups which the Service 400 determines would be beneficial to the users' experience. In FIG. 7, non-contributing member 713 has actively joined the group 705. Additionally non-contributing member 715 is a user which the Service 400 has assigned to this group as a way of delivering desirable content to user 715. For example, if user 715 has shown a preference for car and boat content, user 715 may be passively joined to one of the available boat groups as well as to the car group 705.

The Content Selection System 460, which selects ad and non-ad content to be delivered to the various uses of the Service 400, may select content based on the User Profile Store 501, Content Profile Store 502, and Ad Profile Store 503, as well as group data from the Group Store 701. In this example the Content Selection System 460 selects content for users 713, 712, and 715 shown by lines 765, 766, and 767 respectively. Part of the content experience sessions are indicated by blocks 780, 781, and 782 for users 713, 712, and 715 respectively.

Non-contributing member 713 is shown to receive content segments 721 and 722 which were submitted to the group by contributing members 711 and 712 respectively as indicated previously. Additionally, based on the user's 713 user profile and the content profiles available, non-ad content 723 and ad content 771 are also selected to be delivered to user 713 by the Content Selection System 460 of the Service 400.

Contributing member 712 is shown to receive content segment 721 which was submitted to the group by contributing member 711. User 712 was the contributing member of content segment 722 of which he had already experienced and therefore he is not delivered that segment. Additionally based on the user's 712 user profile and ad and non-ad content profiles available, non-ad content 724 and 723 and ad content 772 are also selected to be delivered to user 713 by the Content Selection System 460 of the Service 400.

Non-contributing member 715 is shown to receive content segment 722 which was submitted to the group by contributing member 712. However, based on the user's 715 profile the Content Selection System 460 determines that content segment 721 of the group's 705 content is not appropriate to be delivered to user 715, and therefore content segment 721 is not selected by the system. Additionally based on the user's 715 user profile and ad and non-ad content profiles available, non-ad content 725 and 726 and ad content 773 are selected to be delivered to user 715 by the Content Selection System 460 of the Service 400.

In summary, persons of ordinary skill in the art will readily appreciate that methods and apparatus for sending content to a media player have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of sending content to a media player, the method comprising:
receiving a plurality of media content by at least one computing device, each received media content having a plurality of content segments;
for each received media content, determining, at the at least one computing device, partial consumption of at least one content segment for at least one of a plurality of different media consumers, said partial consumption comprising at least one of (i) content segment length consumed (ii) content segment duration consumed, and (iii) content segment percentage consumed;
selecting, at the at least one computing device, at least one of the received media content for the at least one media consumer based on (a) first profile data associated with the at least one media consumer, (b) second profile data associated with the selected media content, and (c) statistical data associated with the selected media content, the statistical data corresponding to the partial consumption of at least one content segment of the selected media content, which was consumed by the plurality of media consumers;
associating the selected media content with at least one media file, at the at least one computing device; and
sending the at least one media file from the at least one computing device to the media player associated with the at least one media consumer.

2. The method of claim 1, wherein the first profile data associated with the at least one media consumer includes data automatically selected by a software program based on feedback data.

3. The method of claim 1, wherein the first profile data associated with the at least one media consumer includes data manually selected by at least one media consumer.

4. The method of claim 1, wherein the selecting of the at least one of the received media content for the at least one media consumer includes determining media content based on feedback metadata associated with the received media content.

5. The method of claim 4, wherein the metadata is indicative of at least one of a title, a product, a product category, and a company.

6. The method of claim 1, wherein the selecting of the at least one of the received media content for the at least one media consumer includes determining media content based on metadata associated with the received media content.

7. The method of claim 6, wherein the metadata is indicative of at least one of a previous success rate, a bid level, a number of impressions, a time of day, a user age, and a language.

8. The method of claim 1, wherein the first profile includes data updated by feedback.

9. The method of claim 1, wherein the associating of the selected media content with the at least one media file includes sequencing the selected media content based on a sequence order from the at least one computing device.

10. The method of claim 9, wherein the sequence order is based on metadata of at least one of previous success rate, a bid level, a number of impressions, a time of day, a user age, and a language.

11. The method of claim 1, wherein the at least one media file comprises instructions.

12. The method of claim 1, wherein at least one of the at least one computing device comprises a media player.

13. The method of claim 1, further comprising the step of, after the receiving step and before the determining step, receiving, at the computing device, a signal corresponding to at least one of the received plurality of media content.

14. The method of claim 1, wherein the selecting step includes the media player associated with the at least one media consumer being used to select plural media content segments for the at least one media file while online with said at least one computing device.

15. The method of claim 14, wherein the selecting step includes the media player associated with the at least one media consumer being used to select plural media content segments for the at least one media file while offline with respect to said at least one computing device.

16. The method of claim 15, wherein the media player associated with the at least one media consumer is configured to switch between the online and offline modes.

17. The method of claim 1, further comprising the step of presenting the at least one media file on the media player associated with the at least one media consumer while online with said at least one computing device.

18. The method of claim 17, further comprising the step of presenting the at least one media file on the media player associated with the at least one media consumer while offline with respect to said at least one computing device.

19. The method of claim 18, wherein the media player associated with the at least one media consumer is configured to switch between the online and offline modes.

20. The method of claim 1, wherein the at least one computing device determines the at least partial consumption while offline with respect to the media player of the at least one media consumer.

21. The method of claim 20, wherein, when the media player is online with respect to at least one computing device, the media player provides to the at least one computing device a media file including information corresponding to at least partial consumption determine while the media player is offline.

22. A method of sending content to a media player, the method comprising:
receiving a plurality of media content by at least one computing device, each received media content having a plurality of content segments, at least one content segment comprising at least one user interactive content segment;
selecting, at the at least one computing device, at least one of the received media content for at least one media consumer based on (a) first profile data associated with the at least one media consumer, (b) metadata associated with the selected media content;
associating the selected media content with at least one media file, at the at least one computing device;
sending the at least one media file from the at least one computing device to the media player associated with the at least one media consumer, the at least one media file including the at least one content segment comprising the at least one user interactive content segment;

for each received media content, determining, at the at least one computing device, partial consumption of at least one content segment for at least one of a plurality of different media consumers, said partial consumption comprising at least one of (i) content segment length consumed (ii) content segment duration consumed, and (iii) content segment percentage consumed; and wherein the selecting step includes selecting at least one of the received media content for the at least one media consumer based on statistical data associated with the selected media content, the statistical data corresponding to the partial consumption of at least one content segment of the selected media content, which was consumed by the plurality of media consumers.

* * * * *